United States Patent
Tseng et al.

(10) Patent No.: US 10,891,320 B1
(45) Date of Patent: Jan. 12, 2021

(54) DIGITAL CONTENT EXCERPT IDENTIFICATION

(71) Applicant: Amazon Technologies, Inc., Seattle, WA (US)

(72) Inventors: Walter Manching Tseng, Bellevue, WA (US); Abhishek Patnia, Seattle, WA (US); Adam Joseph Iser, Seattle, WA (US); Christopher Michael Ellis, Seattle, WA (US); Alice Chu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 710 days.

(21) Appl. No.: 14/487,879

(22) Filed: Sep. 16, 2014

(51) Int. Cl.
| | | |
|---|---|---|
| *G06F 16/31* | (2019.01) | |
| *G06F 3/0485* | (2013.01) | |
| *G06F 16/93* | (2019.01) | |

(52) U.S. Cl.
CPC .......... *G06F 16/313* (2019.01); *G06F 3/0485* (2013.01); *G06F 16/93* (2019.01)

(58) Field of Classification Search
CPC ............. G06F 17/30616; G06F 3/0485; G06F 17/30011
USPC .......................................................... 707/751
See application file for complete search history.

(56) References Cited

U.S. PATENT DOCUMENTS

| | | |
|---|---|---|
| 5,544,352 A | 8/1996 | Egger |
| 5,832,494 A | 11/1998 | Egger et al. |
| 7,302,638 B1 | 11/2007 | Wolfe |
| 7,606,809 B2 | 10/2009 | Soroca |
| 7,953,736 B2 | 5/2011 | Rinearson et al. |
| 8,170,979 B2 | 5/2012 | Rinearson |
| 8,356,248 B1 | 1/2013 | Killalea |
| 8,566,348 B2 | 10/2013 | Rinearson et al. |
| 8,606,775 B2 | 12/2013 | Story, Jr. et al. |
| 8,615,513 B2 | 12/2013 | Story, Jr. et al. |
| 8,676,937 B2 | 3/2014 | Rapaport et al. |
| 8,799,493 B1 | 8/2014 | MacInnis et al. |
| 8,799,765 B1 | 8/2014 | MacInnis et al. |
| 8,839,091 B2 | 9/2014 | Ramamurthy et al. |
| 8,842,085 B1 | 9/2014 | Goodspeed et al. |
| 8,914,386 B1 | 12/2014 | Story, Jr. et al. |
| 8,972,420 B1 | 3/2015 | Story, Jr. et al. |
| 8,977,982 B1 | 3/2015 | Amacker |
| 8,994,755 B2 | 3/2015 | Robinson et al. |
| 9,002,701 B2 | 4/2015 | Kandekar et al. |

(Continued)

OTHER PUBLICATIONS

Office action for U.S. Appl. No. 14/487,909, dated Jun. 30, 2016, Tseng et al., "Digital Content Excerpt Identification", 15 pages.

(Continued)

*Primary Examiner* — Alicia M Antoine
(74) *Attorney, Agent, or Firm* — Lee & Hayes, P.C.

(57) ABSTRACT

Described herein are techniques for identifying and displaying key excerpts of a digital work and related key excerpts of other digital works. Key excerpts are identified by evaluating (a) the number of interactions by human readers within each of the key excerpts and (b) the number of reviews that reference each of the key excerpts. Related excerpts from other books can be identified by comparing the key excerpts of the other books. Excerpts can be displayed by subject, and links are provided to move from one subject to another.

20 Claims, 12 Drawing Sheets

(56) References Cited

U.S. PATENT DOCUMENTS

| | | | |
|---|---|---|---|
| 9,069,754 B2 | 6/2015 | Kandekar et al. | |
| 9,087,043 B2 | 7/2015 | Kandekar et al. | |
| 9,128,581 B1 | 9/2015 | Goodspeed et al. | |
| 9,152,734 B2 | 10/2015 | Rinearson et al. | |
| 9,158,741 B1 | 10/2015 | Hansen | |
| 9,165,381 B2 | 10/2015 | Latta et al. | |
| 9,176,938 B1 | 11/2015 | Kerschen et al. | |
| 9,185,134 B1 | 11/2015 | Story, Jr. et al. | |
| 9,251,130 B1 | 2/2016 | Lynnes et al. | |
| 9,264,501 B1 | 2/2016 | Story, Jr. et al. | |
| 9,405,825 B1 | 8/2016 | Kuznetsova et al. | |
| 9,471,203 B1 | 10/2016 | O'Dell, III et al. | |
| 9,471,547 B1 | 10/2016 | Goodspeed et al. | |
| 9,489,853 B2 | 11/2016 | Sherman et al. | |
| 9,552,344 B2 | 1/2017 | Allen et al. | |
| 9,552,346 B2 | 1/2017 | Allen et al. | |
| 9,613,003 B1 | 4/2017 | Goodspeed et al. | |
| 9,639,518 B1 | 5/2017 | Goodspeed et al. | |
| 9,760,547 B1 | 9/2017 | Brougher et al. | |
| 9,910,916 B1 | 3/2018 | Tseng et al. | |
| 9,928,218 B2 | 3/2018 | Cranfill et al. | |
| 10,031,903 B2 | 7/2018 | Haynes, II et al. | |
| 10,108,706 B2 | 10/2018 | Goodspeed et al. | |
| 2003/0009459 A1 | 1/2003 | Chastain et al. | |
| 2003/0218634 A1 | 11/2003 | Kuchinsky et al. | |
| 2004/0009813 A1 | 1/2004 | Wind | |
| 2005/0069849 A1 | 3/2005 | McKinney et al. | |
| 2006/0242554 A1 | 10/2006 | Gerace et al. | |
| 2006/0242564 A1 | 10/2006 | Egger et al. | |
| 2007/0219963 A1 | 9/2007 | Soroca | |
| 2008/0005064 A1 | 1/2008 | Sarukkai | |
| 2008/0168073 A1 | 7/2008 | Siegel et al. | |
| 2008/0243805 A1 | 10/2008 | Gutta et al. | |
| 2008/0282187 A1 | 11/2008 | Buschman et al. | |
| 2009/0172558 A1 | 7/2009 | Pickens et al. | |
| 2009/0265338 A1* | 10/2009 | Kraft | G06F 17/30864 |
| | | | 707/999.005 |
| 2009/0322756 A1 | 12/2009 | Robertson et al. | |
| 2010/0281074 A1 | 11/2010 | Bailor et al. | |
| 2010/0332980 A1 | 12/2010 | Sun et al. | |
| 2010/0332992 A1 | 12/2010 | Donoho et al. | |
| 2011/0047166 A1 | 2/2011 | Stading et al. | |
| 2011/0087956 A1 | 4/2011 | Sherman et al. | |
| 2012/0005209 A1 | 1/2012 | Rinearson et al. | |
| 2012/0036423 A1 | 2/2012 | Haynes, II et al. | |
| 2012/0078612 A1 | 3/2012 | Kandekar et al. | |
| 2012/0078613 A1 | 3/2012 | Kandekar et al. | |
| 2012/0079372 A1* | 3/2012 | Kandekar | G06F 17/2745 |
| | | | 715/256 |
| 2012/0158492 A1 | 6/2012 | Ye et al. | |
| 2012/0158706 A1 | 6/2012 | Story, Jr. et al. | |
| 2012/0158707 A1 | 6/2012 | Story, Jr. et al. | |
| 2012/0210203 A1 | 8/2012 | Kandekar et al. | |
| 2012/0233539 A1 | 9/2012 | Reed | |
| 2012/0290950 A1 | 11/2012 | Rapaport et al. | |
| 2012/0311438 A1 | 12/2012 | Cranfill et al. | |
| 2013/0080881 A1* | 3/2013 | Goodspeed | G06F 17/30041 |
| | | | 715/251 |
| 2013/0104028 A1 | 4/2013 | Murray et al. | |
| 2013/0145327 A1 | 6/2013 | Rinearson et al. | |
| 2013/0155118 A1 | 6/2013 | Robinson et al. | |
| 2013/0173531 A1 | 7/2013 | Rinearson et al. | |
| 2013/0185657 A1 | 7/2013 | Gunawardena et al. | |
| 2013/0198600 A1 | 8/2013 | Lockhart et al. | |
| 2013/0219270 A1 | 8/2013 | Cranfill et al. | |
| 2013/0232134 A1 | 9/2013 | Haugen et al. | |
| 2013/0254645 A1* | 9/2013 | Haynes, II | G06F 17/242 |
| | | | 715/230 |
| 2013/0311870 A1 | 11/2013 | Worsley et al. | |
| 2013/0321390 A1 | 12/2013 | Latta et al. | |
| 2014/0013242 A1 | 1/2014 | Beresford-Wood et al. | |
| 2014/0019893 A1 | 1/2014 | Gudmundsson et al. | |
| 2014/0033128 A1 | 1/2014 | Patterson et al. | |
| 2014/0046973 A1 | 2/2014 | Rinearson et al. | |
| 2014/0101542 A1 | 4/2014 | Albrecht et al. | |
| 2014/0101544 A1 | 4/2014 | Albrecht et al. | |
| 2014/0101606 A1 | 4/2014 | Albrecht et al. | |
| 2014/0143241 A1 | 5/2014 | Barello et al. | |
| 2014/0250377 A1 | 9/2014 | Bisca et al. | |
| 2014/0372956 A1 | 12/2014 | Bisca et al. | |
| 2015/0033110 A1 | 1/2015 | Park | |
| 2015/0089368 A1 | 3/2015 | Lester et al. | |
| 2015/0127639 A1 | 5/2015 | Story, Jr. et al. | |
| 2015/0154166 A1 | 6/2015 | Allen et al. | |
| 2015/0154290 A1 | 6/2015 | Allen et al. | |
| 2015/0177977 A1 | 6/2015 | Amacker | |
| 2015/0193408 A1* | 7/2015 | Ho | G06F 17/30867 |
| | | | 715/255 |
| 2015/0339034 A1* | 11/2015 | Garcia | G06F 17/241 |
| | | | 715/738 |
| 2015/0348157 A1 | 12/2015 | Garcia | |
| 2015/0370453 A1 | 12/2015 | Kandekar et al. | |
| 2015/0379879 A1* | 12/2015 | Selkirk | G06Q 10/00 |
| | | | 434/309 |
| 2016/0026697 A1 | 1/2016 | Rinearson et al. | |
| 2016/0034427 A1* | 2/2016 | Pathak | G06F 17/2229 |
| | | | 715/748 |
| 2016/0071424 A1 | 3/2016 | Harney et al. | |
| 2016/0078102 A1* | 3/2016 | Crouch | G06F 17/30616 |
| | | | 707/722 |
| 2016/0179794 A9* | 6/2016 | Massand | G06F 17/30864 |
| | | | 707/758 |
| 2016/0379392 A1 | 12/2016 | Allen et al. | |
| 2017/0132190 A1* | 5/2017 | Koutrika | G06F 17/30675 |

OTHER PUBLICATIONS

Office action for U.S. Appl. No. 14/487,909, dated Jan. 13, 2017, Tseng et al., "Digital Content Excerpt Identification", 15 pages.

Office action for U.S. Appl. No. 14/487,935, dated Jan. 12, 2017, Tseng et al., "Digital Content Excerpt Identification", 15 pages.

Office action for U.S. Appl. No. 14/487,935, dated Jul. 11, 2017, Tseng et al., "Digital Content Excerpt Identification", 17 pages.

Amy J.C. Trappey, et. al., "Automated Patent Document Summarization for R&D Intellectual Property Management", 2006, IEE, pp. 1-6.

Office action for U.S. Appl. No. 14/487,909, dated Sep. 28, 2017, Tseng et al., "Digital Content Excerpt Identification", 19 pages.

Office Action for U.S. Appl. No. 14/487,909, dated May 22, 2018, Tseng, "Digital Content Excerpt Identification", 26 pages.

Office Action for U.S. Appl. No. 14/487,909, dated Oct. 18, 2018, Tseng et al, "Digital Content Excerpt Identification", 24 pages.

Office Action for U.S. Appl. No. 14/487,909, dated May 1, 2019, Tseng, "Digital Content Excerpt Identification", 20 pages.

* cited by examiner

DIGITAL CONTENT EXCERPT IDENTIFICATION

BACKGROUND

The continued proliferation of digital works has led to an increase in the availability of such works, as well as an increase in the availability of electronic devices and applications used for consuming these works. For instance, users consume digital works, such as electronic books (eBooks), digital videos, digital songs, digital images, and the like, on an assortment of electronic devices. As the number of digital works and devices for consuming digital works continues to increase, users are ever more interested in enhancing their experiences while consuming these works.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A device for reading a digital work such as a book is configured to show key excerpts of the book in a scrollable, card-like format in association with a timeline that shows relative positions of the key excerpts within the book. In certain embodiments, key excerpts are determined by ranking book paragraphs based on the number of interactions by human readers within each paragraph and the number of references to each paragraph by reviews and other materials relating to the book. Interactions may include annotating, sharing, quoting, marking, and so forth.

Key excerpts corresponding to different subjects may be identified and displayed. Key excerpts for an "overview" subject, for example, may include the highest ranking excerpts of the book. Similarly a character or person subject may include the highest ranking excerpts of the book that relate to or reference the character or person. When viewing key excerpts relating to one subject, a user may navigate to key excerpts of a related subject.

The device may also be configured to show key excerpts that are related to a currently displayed key excerpt, such as key excerpts having the same subject, even when the related key excerpts are from other books. In order to identify related key excerpts such as this, the key excerpts of multiple books are identified and compared with each other to identify key excerpts that relate to common entities or topics.

In the following discussion, reference is made to digital works, which are described primarily as books or electronic books. More generally, a digital work comprises a unit of digital content such as a book, movie, song, album, compilation, etc. Digital works may include electronic or digital representations of printed works, such as digital content that may include text, multimedia, hypertext, and hypermedia. Examples of printed and/or digital works include, but are not limited to, books, magazines, newspapers, periodicals, journals, reference materials, slide shows, telephone books, textbooks, anthologies, instruction manuals, proceedings of meetings, forms, directories, maps, web pages, and so on. Further, in some implementations, the techniques described herein can be applied to other types of digital works and digital content besides static content works (like books) to include other media forms like video, music, and so forth. Thus, the terms digital work and digital content may refer to any type of content, not limited to books or electronic books.

Figure 1:
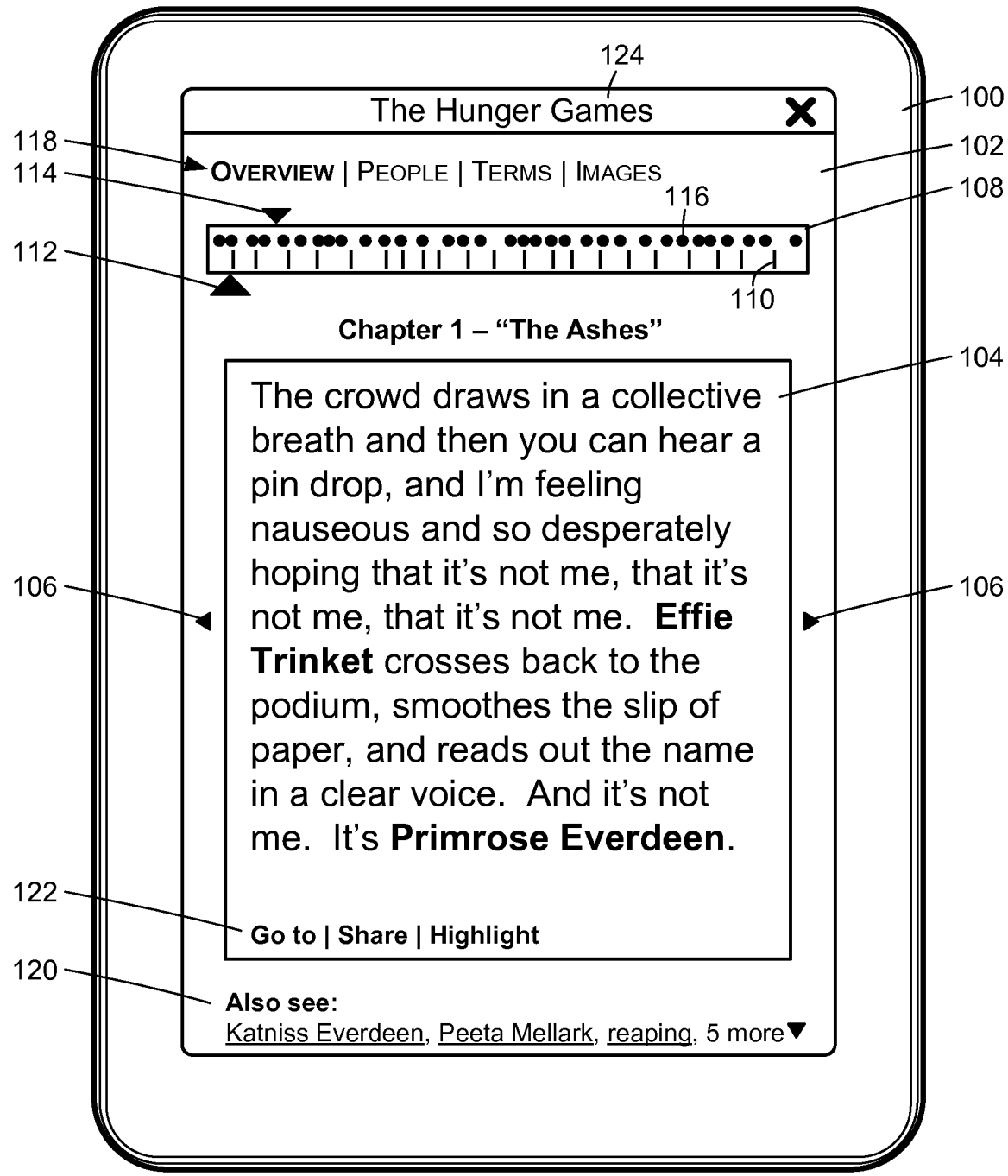
FIGS. 1-4 are conceptual illustrations of example formats for presenting and displaying key excerpts relating to subjects of a digital work such as a book.

FIG. 1 shows a device 100 that is capable of displaying digital works such as electronic books. In the illustrated embodiment, the device 100 is a dedicated book reader designed for the specific purpose of displaying books in a format that replicates the experience of reading a paper book. As noted above, different devices 100 may display or play other types of digital content, including video, audio, and various types of multimedia content.

The device 100 has a display or display area 102. The display 102 may in some cases use reflective display technologies, such as electrophoretic and/or electrowetting technologies, that require relatively low power. Displays incorporating such technologies may be referred to as reflective displays. In other cases the display 102 may comprise a conventional light-emitting color display, such as a flat-panel LED (light-emitting diode) display or LCD (liquid crystal display).

In the illustrated embodiment, the display 102 is sensitive to touch so that a user of the device 100 can interact with displayed content by physically interacting with active visual controls or with the content itself. In other embodiments, the device 100 may have separate buttons or other input mechanisms for accepting user input and for allowing a user to navigate among various types of content and controls presented on the display 102.

Although the illustrated example is of a dedicated, handheld electronic book reader device, other devices may also be used for reading electronic books and for displaying other types of digital works, such as smartphones, tablet computers, laptop computers, televisions, wearable devices (e.g., watches, glasses, athletic-focused devices, health monitors, etc.), automobile displays, projecting units, electronic billboards, or any other type of device having a text or graphics display. User input may be by means of touch, sound (e.g., voice, taps, etc.), gesture, keyboards, buttons, pointing devices, and so forth.

Figure 5:
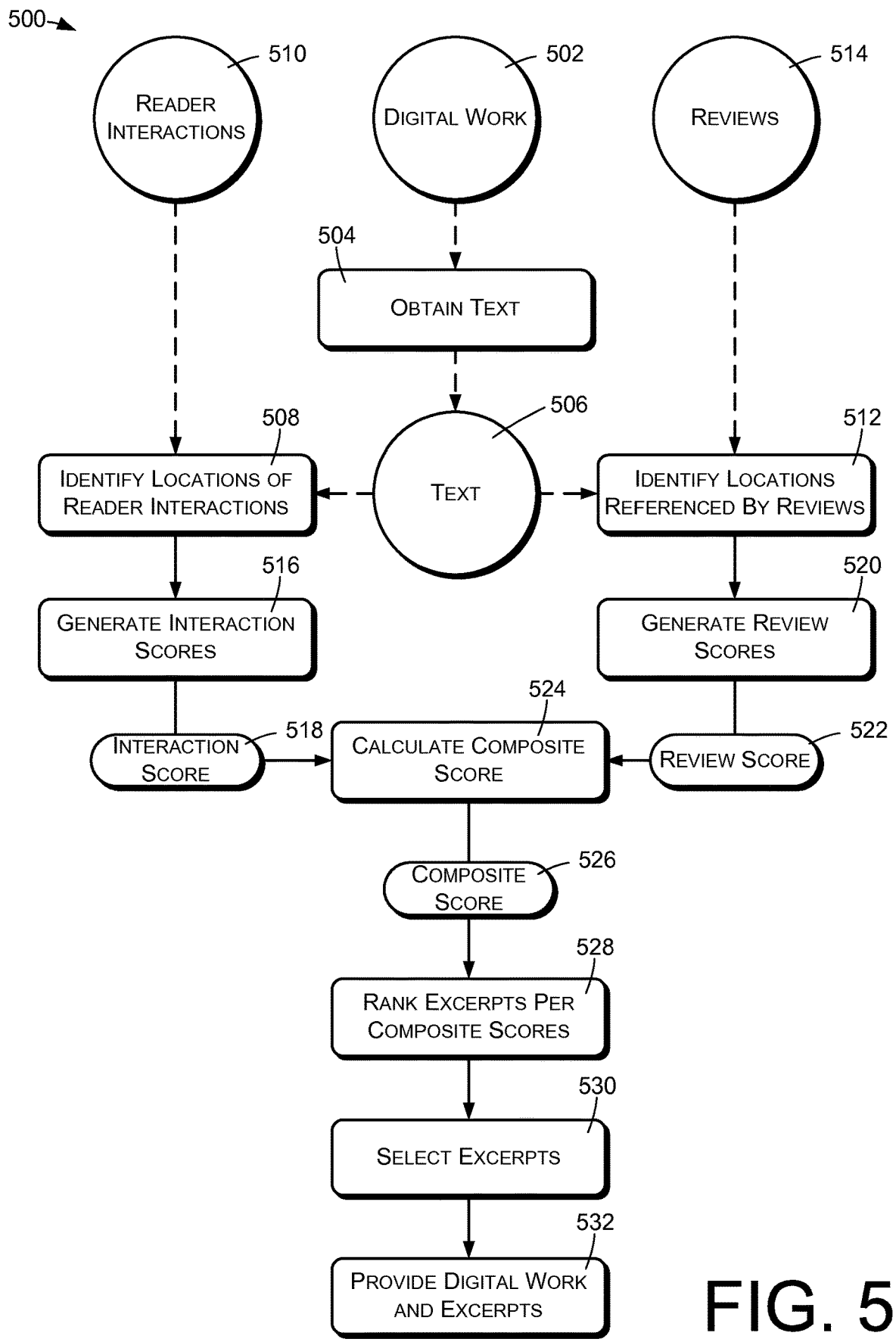
FIG. 5 is a flow diagram illustrating an example process for identifying key excerpts of a digital work such as a book.

In addition to displaying text and other content of an electronic book, the device 100 is configured to present certain excerpts of the book, which have been found to comprise important or other types of key elements of the book, in a format such as shown in FIG. 1. In the following discussion, excerpts that have been evaluated as being important or key elements of the book, in accordance with a method described in FIG. 5, are referred to as key excerpts. In the described embodiment, the key excerpts are displayed within an excerpt area 104 of the display 102.

A particular book may have multiple key excerpts. In the illustrated embodiment, the key excerpts comprise paragraphs that have been identified according to an algorithm that ranks the paragraphs based on user interactions and reader reviews. However, a key excerpt need not be a paragraph. Rather, a key excerpt may comprise any portion of the content, whose bounds are set by syntax, context, range of words, collection of ideas, number of sentences, and/or any other manner.

The key excerpts are displayed one at a time in the excerpt area 104. Scroll controls 106 are displayed on either side of the excerpt area 104 to scroll forward or backward through the key excerpts of the book. Touching the left scroll control 106 causes a previous key excerpt to be presented in the excerpt area 104. Touching the right scroll control 106 causes a subsequent key excerpt to be presented in the excerpt area 104. In some cases, a user may also, or alternatively, scroll through key excerpts by dragging across the excerpt area 104 with a finger to the left or to the right. The device 100 is configured to detect coordinates of finger placement on the display 102, to detect movement of the finger across the excerpt area 104, and to control the display 102 so that the key excerpts appear to move horizontally across the display 102 in response to the movement of the finger across the excerpt area 104. In some embodiments, the key excerpts may be configured to scroll or move vertically instead of horizontally.

In addition to books, the excerpt area 104 may be used to display key excerpts of other types of content, including content other than text. For example, text corresponding to key audio excerpts can be displayed while audio content is playing. As another example, video content (e.g., movies, TV shows, etc.) can be playing while key video excerpts are presented in an excerpt area. Furthermore, multiple devices may be used in some implementations to present the content and associated key excerpts. For instance, video content may be playing on one device, such as a television or other screen, while the key excerpts are displayed on a separate device, such as a tablet, computer, or communication device.

A timeline 108 may also be displayed in conjunction with the excerpt area 104. Horizontal positions along the timeline 108 correspond to locations within the currently loaded or currently active book. Specifically, the left-most position along the timeline 108 corresponds to the beginning of the book. The right-most position along the timeline 108 corresponds to the end of the book. Intermediate positions from left to right along the timeline 108 correspond to intermediate locations from the beginning to the end of the book.

Chapter marks 110 may be presented on or within the timeline 108 to indicate chapter divisions. An excerpt location marker 112 may be positioned along the timeline 108 to indicate the location within the book of the currently displayed key excerpt. A furthest-read marker 114 may be positioned along the timeline 108 to indicate the furthest location within the book that has been read or viewed. The furthest location may be tracked by monitoring a user's progress through a book and repeatedly updating a stored variable that indicates the furthest page within the book that has been displayed. In some cases, this information may be stored in conjunction with an online account of the user and accessed by multiple devices of the user so that the furthest point read is accurate regardless of which device the user chooses to use at any given time.

Excerpt markers 116, small dots in this example, may be positioned along the timeline 108 to indicate the locations of certain key excerpts within the book.

The timeline 108 may comprise an active control that can be manipulated by a user to scroll through multiple key excerpts. For example, the user may touch the excerpt location marker 112 and drag it along the timeline 108 to move to different locations within the book and to display the corresponding key excerpt at each location. The device 100 may sense that the user touches the area of the display 102 corresponding to the timeline 108, may further sense that the user moves their finger along the timeline 108, and may respond by moving the excerpt location marker 112 and changing the excerpt area 104 to display the key excerpt corresponding to the new position of the excerpt location marker 112. Alternatively, a user may simply touch a position along the timeline 108, thereby causing a key excerpt at the corresponding book location to be displayed in the excerpt area 104. In this case, the device 100 may sense the location of the user touch relative to the timeline 108, may move the excerpt location marker 112 to the corresponding location, and may change the excerpt area 104 to display the key excerpt corresponding to the new position of the excerpt location marker 112.

The device 100 may also be configured to present a category menu 118 having items or tabs corresponding to different categories of content. In the illustrated example, categories include "Overview," "People," "Terms," and "Images." Selecting the "Overview" tab results in the display presentation illustrated in FIG. 1, in which the user may scroll between different key excerpts of the book. Selecting the "People" tab invokes a different display such as an index of key people referenced in the book. Selecting the "Terms" tab invokes yet another display such as an index of key terms used in the book. Selecting the "Images" tab invokes a display such as an index of images or key images contained in the book.

Various referenced entities may be visually highlighted or otherwise emphasized within the excerpt area 104, so that such entities stand out visually with respect to the underlying content. Text corresponding to the entity may be emphasized by shading, by using a distinctive font, by using a contrasting font color, and so forth. Generally, the text is emphasized in a way that makes it apparent that the user can select the text in order to navigate to corresponding or related information.

Generally, an entity in this context may comprise a named entity, a character, a person, a place, an event, an object, a term, etc. In some implementations, each emphasized entity may be selectable by the user. Selecting an emphasized entity may invoke a display relating to that entity, such as the display shown in FIG. 4, described below. Alternatively, or additionally, an "Also see:" section 120 may be presented, indicating entities that are relevant to the currently displayed excerpt. A user may select any one of the entities within the "Also see:" section, which invokes a display relating to the entity.

The excerpt area 104 may also include an excerpt action menu 122 containing controls that can be selected by a user to perform actions relating to the currently displayed key excerpt. For example, such controls may include a "go to" control that may be selected to display a reading view of the full text of the active book at the location of the currently displayed key excerpt. The controls may also include a "share" control that may be selected to share the displayed key excerpt, such as by sharing the key excerpt and related information on a social media account of the user. The controls may also include a "highlight" control that may be selected to highlight the displayed key excerpt in book reading views.

A book title heading 124 may be used to indicate the title of the currently loaded or active electronic book.

Figure 2:
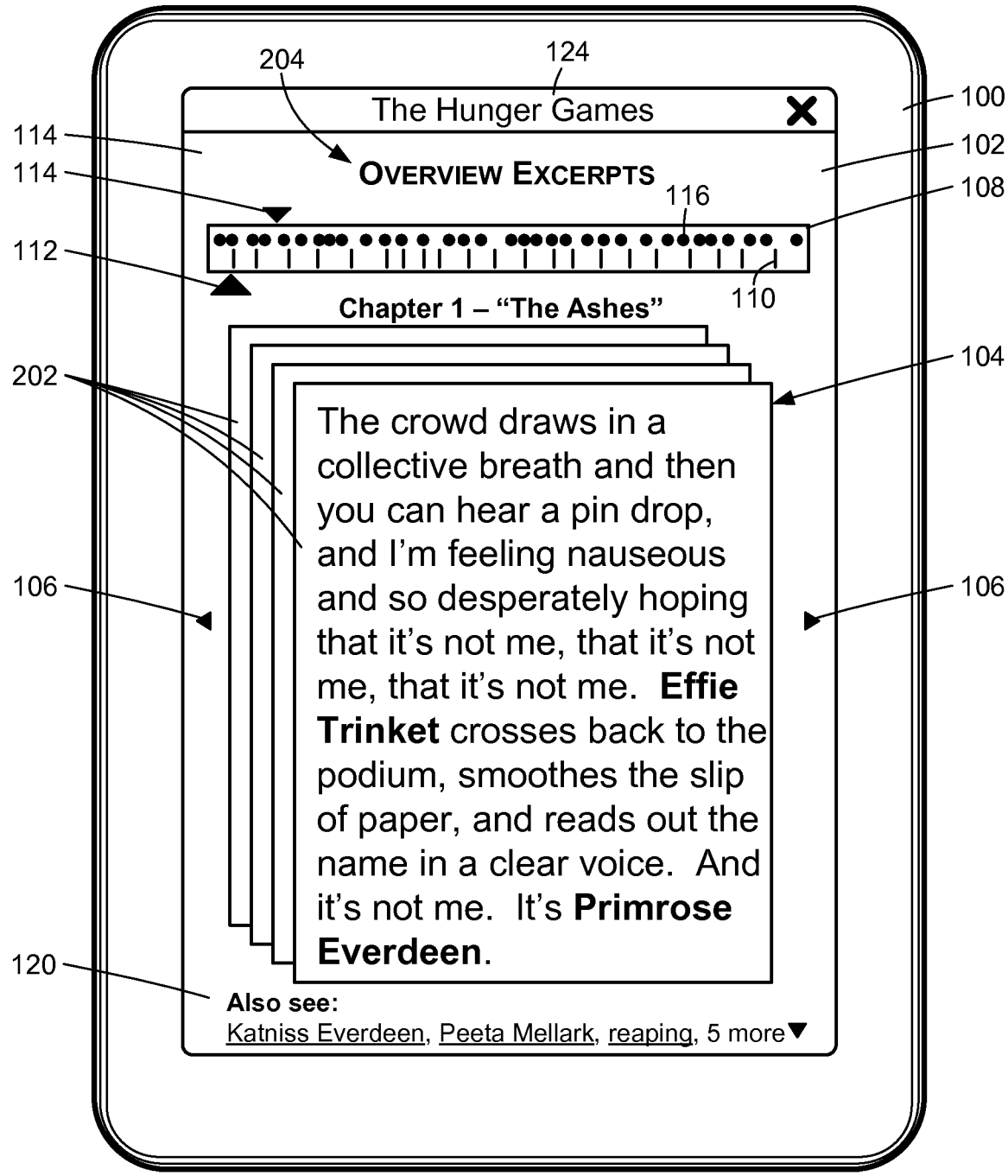

FIG. 2 shows an alternative format or presentation of key excerpts relating to an active book. The format of FIG. 2 is similar to that of FIG. 1 except that the excerpt area 104 in this example is configured as a plurality of individual panes or cards 202 that are visually stacked, cascaded, or overlaid on each other. Each of the cards 202 corresponds to a key excerpt of the book. Only the topmost of the cards is fully visible at any time, and the text of underlying cards may be hidden by overlying cards. A user may select the scroll controls 106 to move through the stacked cards 202. Alternatively, the user may scroll through the cards by dragging their finger across the currently displayed card 202. For example, dragging the currently displayed card to the right may expose the immediately underlying card and its associated text, while the previously displayed card moves off of the display area and conceptually moves to the bottom of the stack. The display 102 may be configured to detect the location and movement of the user's finger across the excerpt area 104 and may respond by controlling the display 102 so that the displayed cards 202 appear to move along with the user's finger.

FIG. 2 also has a subject heading 204 indicating the type or subject of the key excerpts displayed in the excerpt area 104. In this case, the displayed key excerpts are overview key excerpts, relating to the general content of the book.

Figure 3:
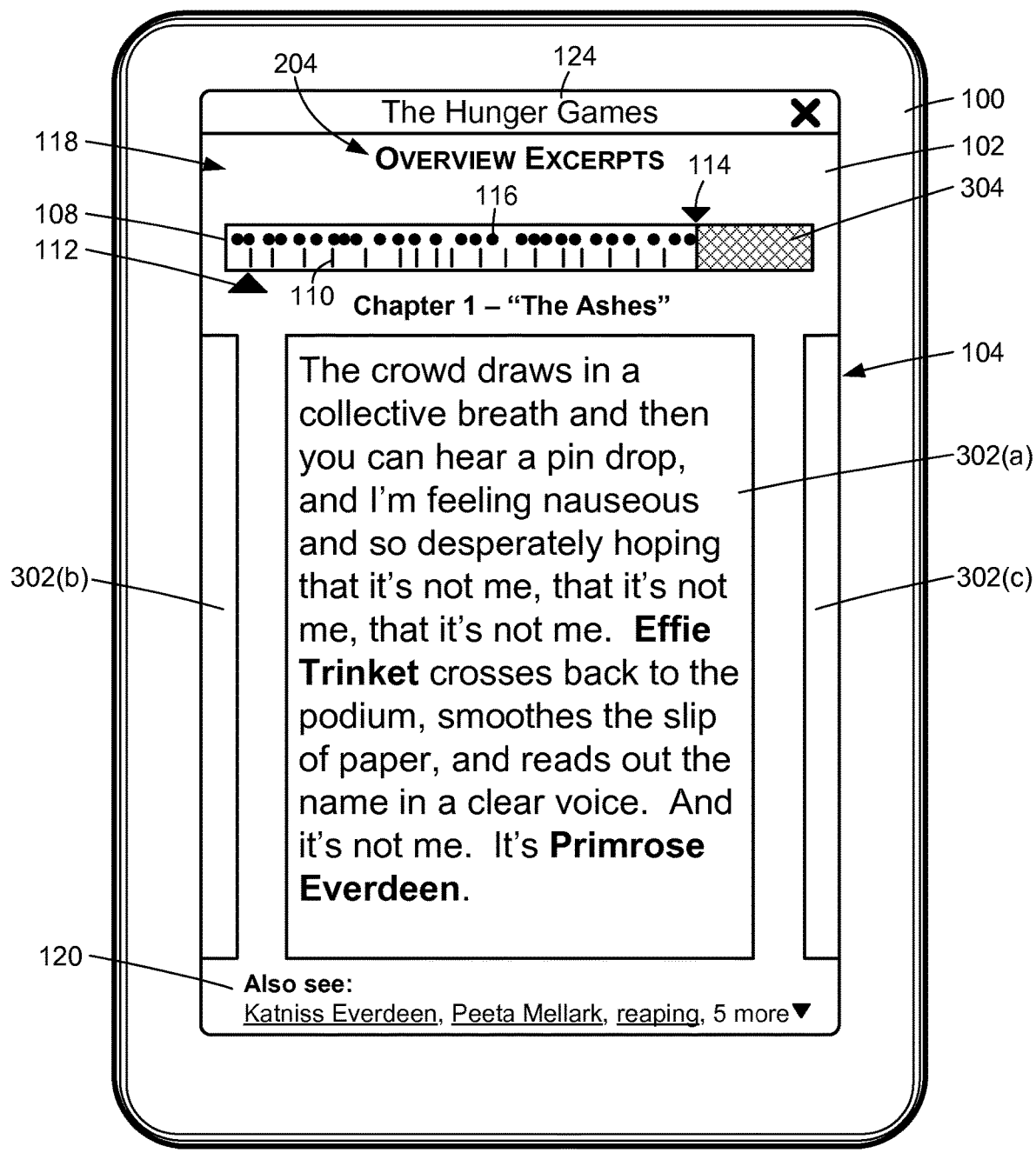

FIG. 3 shows yet another format, configuration, or presentation style for the excerpt area 104. In FIG. 3 the excerpt area 104 is configured as a plurality of individual panes or cards 302 that are conceptually arranged in a horizontal row, within which only one of the cards is fully visible at any time. Specifically, a central card 302(a) is fully visible and the edges of adjacent cards 302(b) and 302(c) are partially visible at the sides of the excerpt area 104. In this example, a user may scroll through the cards 302 by dragging their finger horizontally across the display 102. For example, dragging the currently displayed card 302(a) to the right may move the side card 302(b) into the display area, replacing the previously displayed card 302(a). Directional controls, keys, or other mechanisms may also be used for scrolling the cards 302. The display 102 may be configured to detect the location and movement of the user's finger across the excerpt area 104 and may respond by controlling the display 102 so that the displayed cards 302 appear to move in this fashion. Touching the side cards 302(b) or 302(c) may also cause the cards to scroll.

FIG. 3 also shows a modification of the timeline 108 to hide a portion 304 of the timeline 108 corresponding to a portion of the book that has not been read, such as the part of the book beyond the point indicated by the furthest-read marker 114. In some implementations, the user may be prevented from scrolling to key excerpts that are beyond the location indicated by the furthest-read marker 114.

Figure 4:
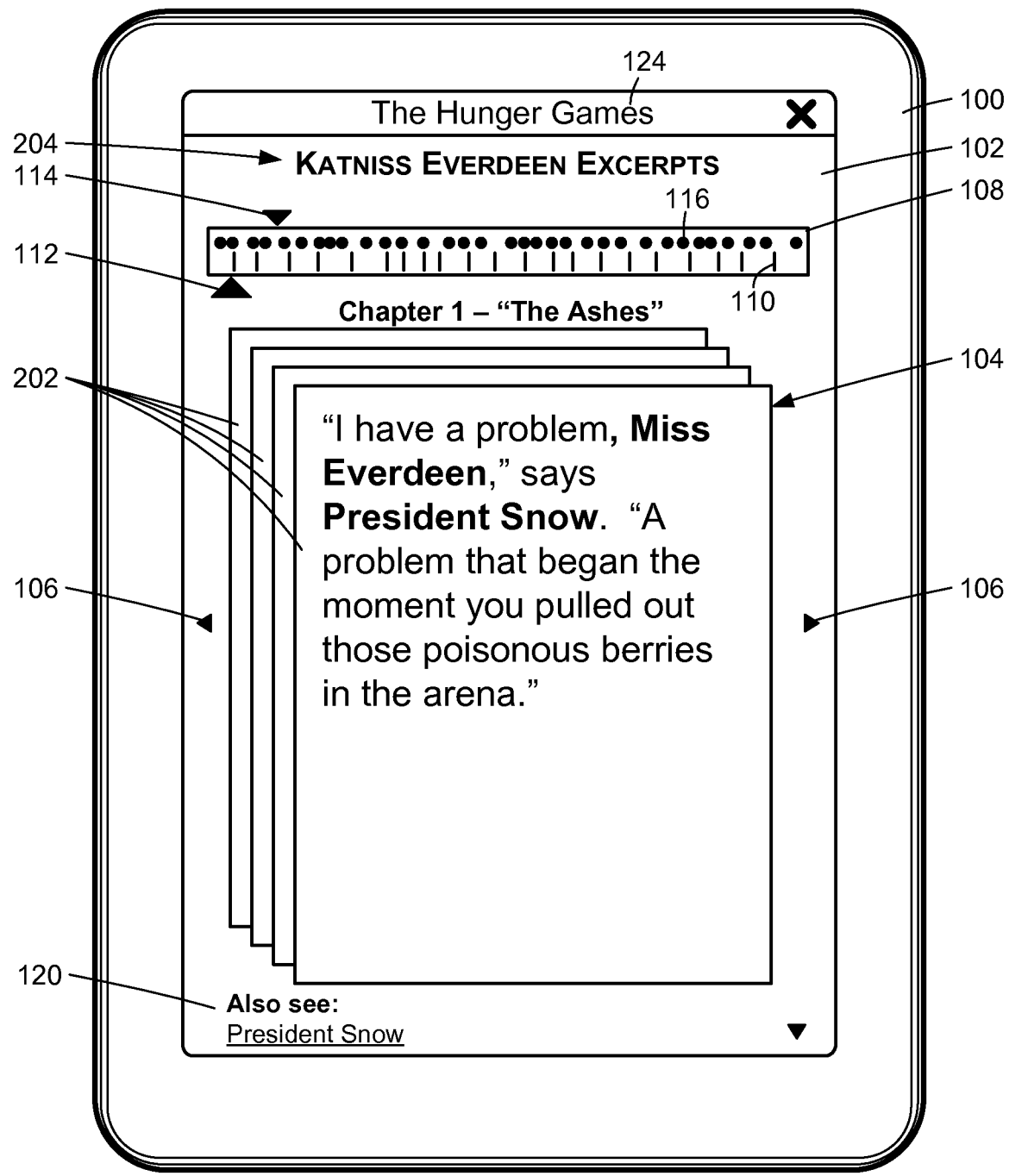

FIG. 4 shows an example format for presenting key excerpts relating to a different subject. Generally, there may be a set of key excerpts and an associated timeline for each of multiple subjects within a digital work. In the previous examples, key excerpts of a "general" or "overview" subject were displayed. In the example of FIG. 4, displayed key excerpts are of a person subject. Particularly, key excerpts relating to the subject "Katniss Everdeen," as indicated by the subject heading 204, are displayed in the excerpt area 104. The excerpt markers 116 of the timeline 108 indicate the locations of the excerpts relating to the current subject. Note that the excerpt area 104 in this situation may be formatted in different ways such as illustrated by the examples of FIGS. 1-3.

In addition to the overview subject, different subjects may comprise, without limitation:
different characters;
different entities;
different named entities;
different objects;
different terms;
different places;
different events; or
different topics.

A user may navigate between different timelines and their associated key excerpts in various ways. A user may select an entity, which corresponds to a subject, from either the excerpt area 104 or the "Also see:" section 120. Selecting an entity or subject in this manner changes the currently displayed subject to the selected subject. In FIG. 4, for example, a user may select the subject "President Snow" from either the excerpt area 104 or the "Also see:" section 120, which will change the currently displayed subject to "President Snow" and will cause the displayed excerpts to be those relating to the subject "President Snow." In FIG. 1, as another example, a user may select any of the subjects "Effie Trinket," Primrose Everdeen," Peeta Mellark," or "reaping" to move to one of those subjects. When a subject is selected, the timeline 108 changes to show the positions of the key excerpts relating to the selected subject and the excerpt area 104 displays cards or key excerpts relating to the selected subject.

A user may also select an entity from various indexes that may be presented in conjunction with the currently loaded book. For example, selecting the "People" item of the category menu 118 (FIG. 1) may present a list or index of key people of a book, and a user may select one of those people to display a timeline and associated key excerpts relating to the selected person, where the subject corresponds to the person.

Selections for related subject matter may be based on any number of factors. In one implementation, the selection is based on relationships formed in the content of various key excerpt cards. For example, in FIG. 4, one card 202 includes reference to both President Snow and Miss Everdeen. As a result, these two characters or people would be related and other cards with reference to President Snow or Miss Everdeen would be identified and offered as possible interest to the user. In other implementations, the selection may be based on whether subject matter shows up in the same scene or some other logical segmentation of the digital work, such as a chapter or section of a book, or scene of a movie.

FIG. 5 shows an example process 500 for identifying or selecting key excerpts of a digital work 502 or other digital content. The digital work 502 may comprise an electronic book in the described examples, although the work or content may comprise other types of media as mentioned above. The process 500 may be performed by a computer or group of computers prior to providing books to electronic book readers, so that electronic books may be provided with associated timelines and key excerpts relating to multiple subjects. The process 500 may be performed by or on behalf of a content provider and/or content infrastructure that supports distribution of digital works to multiple electronic readers.

An action 504 comprises obtaining the text 506 of the digital work 502. An action 508 comprises identifying locations within the text 506 at which readers have interacted with the digital work 502. More specifically, the action 508 may comprise, for each reader of multiple human readers, identifying one or more locations within the text 506 at which the reader interacted with the digital work, wherein the user interactions are determined based on metadata associated with words of the text, and wherein the metadata indicates one or more of annotating, quoting, sharing, or marking by the reader. A user may annotate a digital work by composing notes or comments that are associated with particular locations of the digital work. A user may quote or share portions of a digital work in reviews or in comments on social media sites. A user may mark portions of a digital work by underlining, highlighting, or otherwise recording certain portions of the digital work. A particular reader device or application may provide for annotating, quoting, sharing, or marking in various ways, such as through menus, on-screen controls, detection of user gestures, etc.

A location in this context may comprise a particular point within the text 506, a paragraph of the text 506, or some other delineation of content, which may be indicated by character or word counts with respect to the beginning of the book. In other types of content such as audio or video, a location may correspond to a time from the beginning of the content as indicated by number of minutes, seconds, or other time segments. Some types of content, such as audio books, may have locations indicated in terms of both character or word count and elapsed time. Alternatively, a location may correspond to a scene or other segment of a digital work.

In embodiments in which excerpts comprise paragraphs, the action 508 may comprise determining an annotation location associated with a particular location within the content and determining that the word location is within a range of word locations associated a particular paragraph.

The action 508 may draw from a database 510 of archived reader interactions by multiple human readers with respect to multiple digital works. For example, electronic reader devices or applications of a particular distribution infrastructure may be designed to allow users to mark (such as by highlighting or underlining), quote, share, or annotate within a digital work. These interactions may be recorded and archived by the infrastructure and used as the basis for the action 508.

An action 512 comprises, for each of multiple reviews of the digital work 502, analyzing the review to determine one or more locations within the text 506 that the review references. The action 512 may draw from a database 514 of archived reviews of multiple digital works. For example, a particular distribution infrastructure may provide public forums or feedback mechanisms allowing purchasers of digital works to provide textual reviews of the digital works. Reviews may also be obtained from various social media sites, from various publications that may include reviews by critics, and so forth. With respect to social media, the reviews may be extracted or assumed from the context of the social media interactions, such as emotive views expressed in tweets or on social media posts. Reviews may also include marketing materials associated with digital works, such as synopses, summaries, book flap text, etc.

The action 512 may comprise approximate string matching, sometimes referred to as fuzzy string searching, implemented to find text strings within the text 506 that at least approximately match text strings within the reviews 514 of the digital work 502. In some cases, n-gram matching may be used to find consecutive word matches between the reviews and the digital work, wherein the n-grams range in length from five to ten words.

An action 516 comprises generating interaction scores 518 for respective locations within the text 506, wherein each interaction score 518 comprises the number or a function of the number of readers who interacted with the text at a particular location.

An action 520 comprises generating review scores 522 for respective locations within the text 506, wherein each review score is the number or a function of the number of the reviews that reference the text of the digital work at a particular location. In some cases, the review scores may be weighted by social media information, such as popularity ratings or "likes" corresponding respectively to each of the reviews 514.

An action 524 comprises calculating a composite score 526 corresponding to each of multiple excerpts of the text 506, wherein each composite score 526 is a function of those interaction scores 518 and review scores 522 that correspond to locations within the corresponding excerpt. The composite score 526 for a particular excerpt may for example comprise the sum of those interaction scores 518 and review scores 522 that correspond to locations within the excerpt. In some cases, the interaction scores and review scores may be weighted or normalized prior to calculating the composite score 526.

An action 528 comprises ranking excerpts of the digital work 502 in accordance with the composite scores 526 of the excerpts. Excerpts with higher composite scores are given higher rankings. In some cases, the excerpts may be ranked by their composite scores on a logarithmic scale.

An action 530 comprises selecting and providing a set of the excerpts to indicate important or key parts of the digital work. The excerpts of the set are referred to as key excerpts. Key excerpts may be selected based on any number of factors. In one case, key excerpts may comprise the highest ranking excerpts from the ranking action 528. In other implementations, key excerpts are selected based in part on their position and context within the work. For instance, a dispersion algorithm may be applied to ensure a more distributed selection of key excerpts throughout the work. In the absence of quotes or highlights, selection may involve choosing the first paragraph of each chapter or section, or choosing key excerpts from every section that contains reference to certain subject matter, such as a main character. Any number of weighting and/or filtering techniques may be used to weight various paragraphs or portions of a digital work in the absence of user highlights, quotes, or other interactions.

An action 532 comprises providing the digital work 502 to an electronic reader or other device along with a specification of the highest ranking or otherwise selected excerpts. In certain embodiments, a certain percentage of the existing excerpts may be selected and indicated to the electronic reader along with the digital work. In certain embodiments, highest ranking excerpts within each section or chapter of the digital work may be selected as key excerpts.

The number of key excerpts selected for a particular book may be based on the length of the book. The number of key excerpts selected within each chapter of a book may be based on chapter length. In some cases, excerpts having a ranking above a certain threshold may be selected as key excerpts. In cases where no excerpts of a chapter are above the threshold, the first excerpt of the chapter may be selected as a key excerpt representative of the chapter. In some cases, additional key excerpts may be selected regarding particular characters or entities, such as paragraphs that introduce particular characters or entities. In some cases, excerpts that may otherwise qualify as key excerpts may be disqualified based on certain factors, such as when such an excerpt does not relate to key characters or subjects of the book. In some cases, the ranking of a paragraph may be weighted based on whether or not the paragraph contains or references a key subject of the digital work, with paragraphs that do contain or reference a key subject being weighted more highly than those that do not.

Locations and key excerpts within the text 506 may correspond to different units of text, corresponding to different levels of granularity. In certain embodiments, the locations to which interaction and review scores correspond may comprise sentences. Key excerpts may comprise paragraphs. In some cases, only paragraphs having at least a threshold length are considered as valid excerpts or key excerpts.

The process 500 may be used to identify top ranking excerpts of the digital work as a whole, which may be designated as being related to the "overview" or "general" subject described above. In addition, the process 500 may be used to identify top ranking excerpts relating to a particular entity or subject by constraining the action 524 to text locations that are within excerpts of the text 506 that reference or relate to the entity or subject. When identifying key excerpts relating to a particular character, for example, only those interaction and review scores 518 and 522 that correspond to locations within excerpts relating to that particular character are considered when calculating the composite score 526. Rankings of excerpts identified in this manner, with regarding to a particular subject, may be provided as an indication of relative importance of excerpts that reference or relate to the particular subject.

In some cases, the process 500 may be performed separately for different defined sections of a digital work, and the top ranking excerpts may comprise the highest ranking excerpts from each section. This ensures that key excerpts will be evenly distributed throughout the sections of a book. Sections may correspond to chapters, scenes, topical divisions, or other logical divisions within the content.

As an example, the process 500 may be implemented by (a) defining a first section of the digital work, wherein the first section of the digital work comprises a first set of contiguous paragraphs; (b) defining a second section of the digital work, wherein the second section of the digital work comprises a second set of multiple contiguous paragraphs; (c) specifying a first paragraph from the first section of the digital work for presentation in conjunction with the digital work; and (d) specifying a second paragraph from the second section of the digital work for presentation in conjunction with the digital work.

Figure 6:
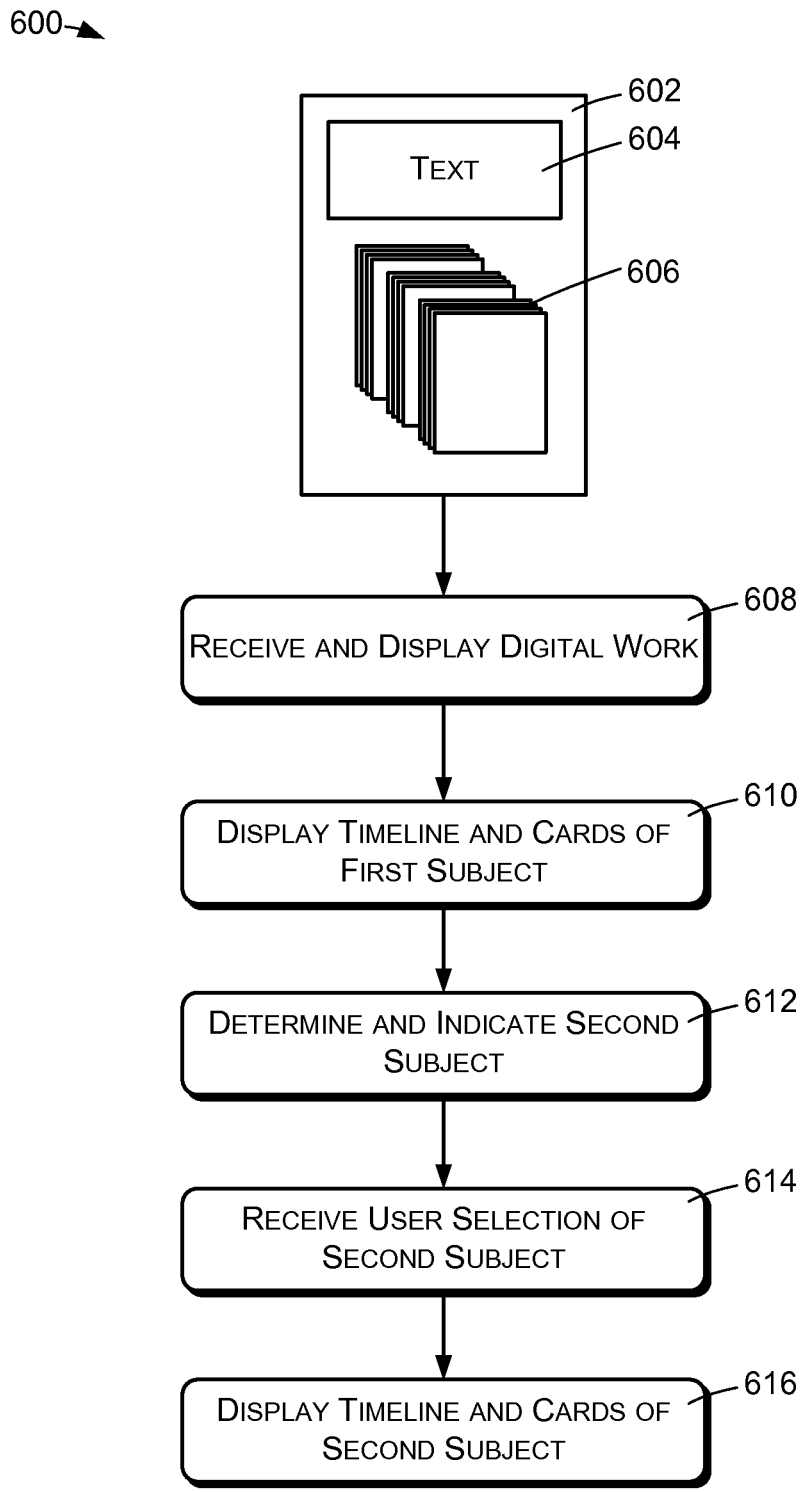
FIG. 6 is a flow diagram illustrating an example process for displaying key excerpts relating to different subjects of a digital work.

FIG. 6 shows an example process 600 for displaying key excerpts relating to different subjects and for allowing a user to navigate between timelines and key excerpts relating to different subjects. The process 600 may be performed by a device such as a handheld reader device.

A book or other digital work may be formatted or delivered as a distribution package 602, containing book text and/or other content 604 and multiple key excerpt sets 606. The content 604 may include the text of the digital work as well as accompanying illustrations, diagrams, pictures, or other associated content. The key excerpts of the sets 606 may also include or comprise objects other than text, such as illustrations, diagrams, pictures, drawings, or other non-text items of a digital work.

Each key excerpt set 606 may relate to a different subject of the digital work, and may contain multiple key excerpts relating to the subject. Each subject may comprise, without limitation:
- an overview of the digital work;
- a character;
- an entity;
- a named entity;
- an object;
- a term;
- a place;
- an event; or
- a topic.

For purposes of discussion, it is assumed that the excerpts comprise at least a first set of key excerpts corresponding or relating to a first subject and a second set of key excerpts corresponding or relating to a second subject.

An action 608 comprises receiving a digital work and presenting or displaying at least a portion of the digital work on the display of an electronic device such as an electronic book reader. The digital work may be presented as pages that can be scrolled for individual viewing using various input mechanisms such as touch, keyboard input, or dedicated buttons. For example, a digital reader may detect finger placement and movement on a screen and may respond by navigating through pages of the book.

Receiving the digital work may include receiving the text or other content 604 along with an indication or specification of multiple key excerpts, such as the key excerpt sets 606. In certain implementations, the key excerpts 606 may have been selected and/or ranked based at least in part on (a) a number of interactions by human readers within each of the excerpts and (b) a number of reviews that reference each of the excerpts. In certain embodiments, the indicated excerpts may be identified or ranked in accordance with the process 500 of FIG. 5.

An action 610, which is performed in response to a user input, comprises displaying a first set of cards and an associated first timeline, both of which relate to the first subject. Each card corresponds to or contains a key excerpt of the key excerpt sets 606, which may in turn comprise a key paragraph of the book. The action 610 may comprise presenting the cards in a scrollable format and visibly scrolling through the cards to display a selected one of the cards. Scrolling may be implemented in various ways, including but not limited to:
- detecting selection of a point along the first timeline;
- detecting dragging across the first timeline;
- detecting selection of a directional control; or
- detecting dragging across an excerpt area in which the first excerpts are presented.

As described above, the first timeline may indicate a location within the digital work of the currently displayed card. The first timeline may also indicate the relative locations of other cards of the first set relating to the first subject.

The action 610 may utilize any of the display formats that have already been described with reference to FIGS. 1-4.

An action 612 comprises displaying an indication of the second subject along with the currently displayed card. The second subject may be any subject that is related to the currently displayed card in some way, such as being referenced by the currently displayed card. Referring to FIG. 1 as an example, the second subject may be indicated by highlighting in the excerpt area 104, such as are the subjects "Effie Trinket" and "Primrose Everdeen." As another example illustrated by FIG. 1, the "Also see:" section may indicate related subjects.

An action 614 comprises receiving user input such as a selection of the second subject. For example a user may touch or otherwise select one of the indicated or highlighted subjects shown in FIG. 1.

An action 616 is performed in response to receiving the user selection of the second subject. The action 616 comprises presenting cards relating to the second subject, in a scrollable format for visibly scrolling through the cards to display a selected one of the cards. The action 616 also comprises displaying a second timeline with the cards of the second subject. As already described, such a timeline indicates a location within the digital work of the currently displayed one of the cards. The timeline may also indicate the relative locations of other cards of the second subject.

In some cases, the key excerpts 606 may include key excerpts from different books or other digital works. As one example, key excerpts may be included from other books that are related as works of the same series, as works having common authorship, or as works having a common subject. As another example, key excerpts may be included from other books based on similarities of the key excerpts of the other books to the key excerpts of the displayed book. A process for identifying related or similar key excerpts from other books will be described below with reference to FIG. 10.

Figure 7:
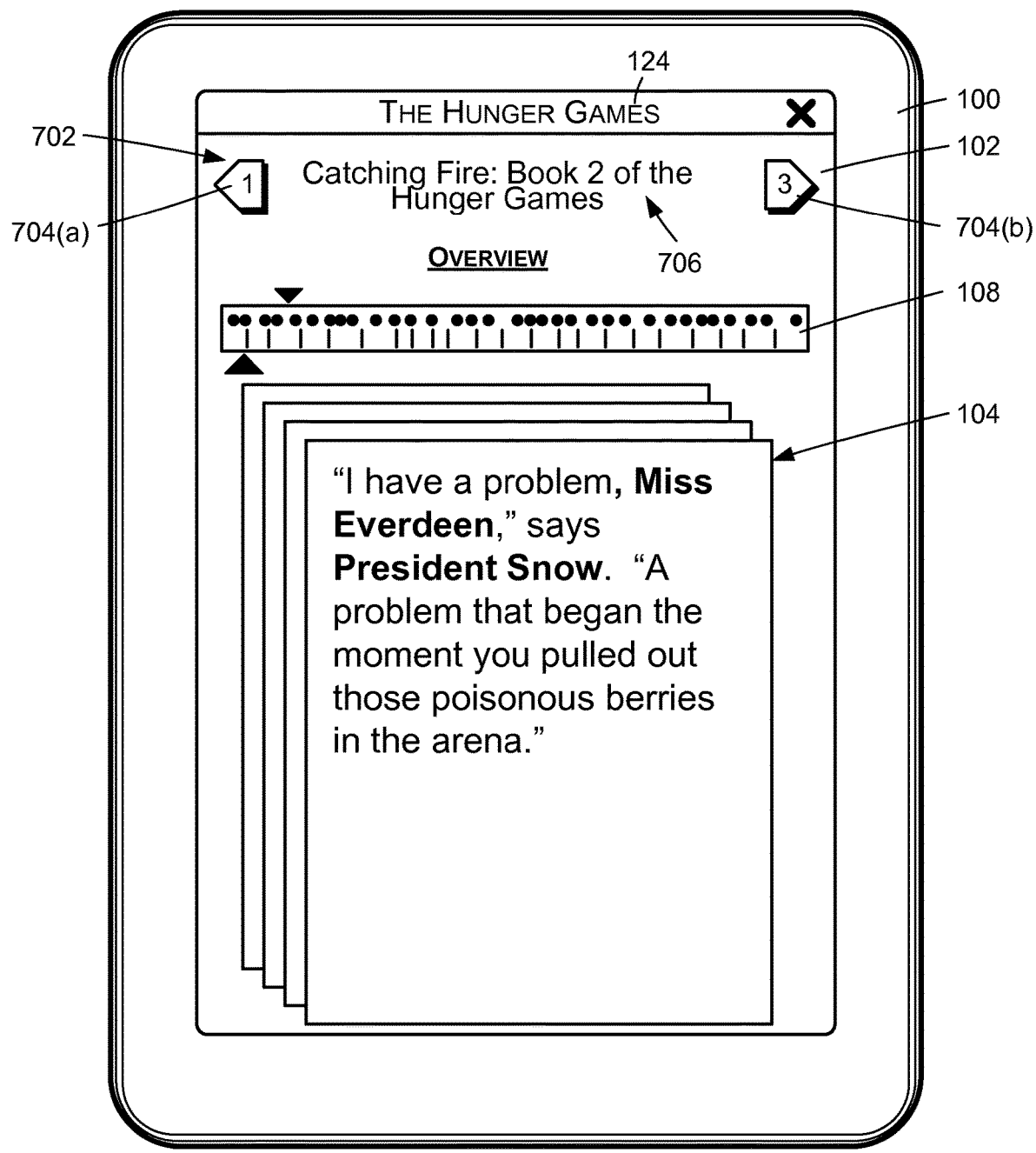
FIG. 7 is a conceptual diagram illustrating an example format for presenting and displaying key excerpts from related books.

FIG. 7 shows an example of a display format for presenting key excerpts of works that are related to the currently loaded book, such as books of a common series, books having common authorship, or books having a common topic. In this example, a book navigation control 702 has a left selector 704(*a*) and a right selector 704(*b*) that can be selected by a user to move between related works. A heading 706 within the navigation control 702 indicates the title of the currently selected related work. The excerpt area 104 is configured to display the key overview excerpts of the related work indicated by the heading 706, and the timeline 108 is configured so that it shows positions of the displayed key excerpts relative to the work indicated by the heading 706. The book title heading 124 continues to show the title of the book that is currently loaded for reading by the device 100.

Figure 8:
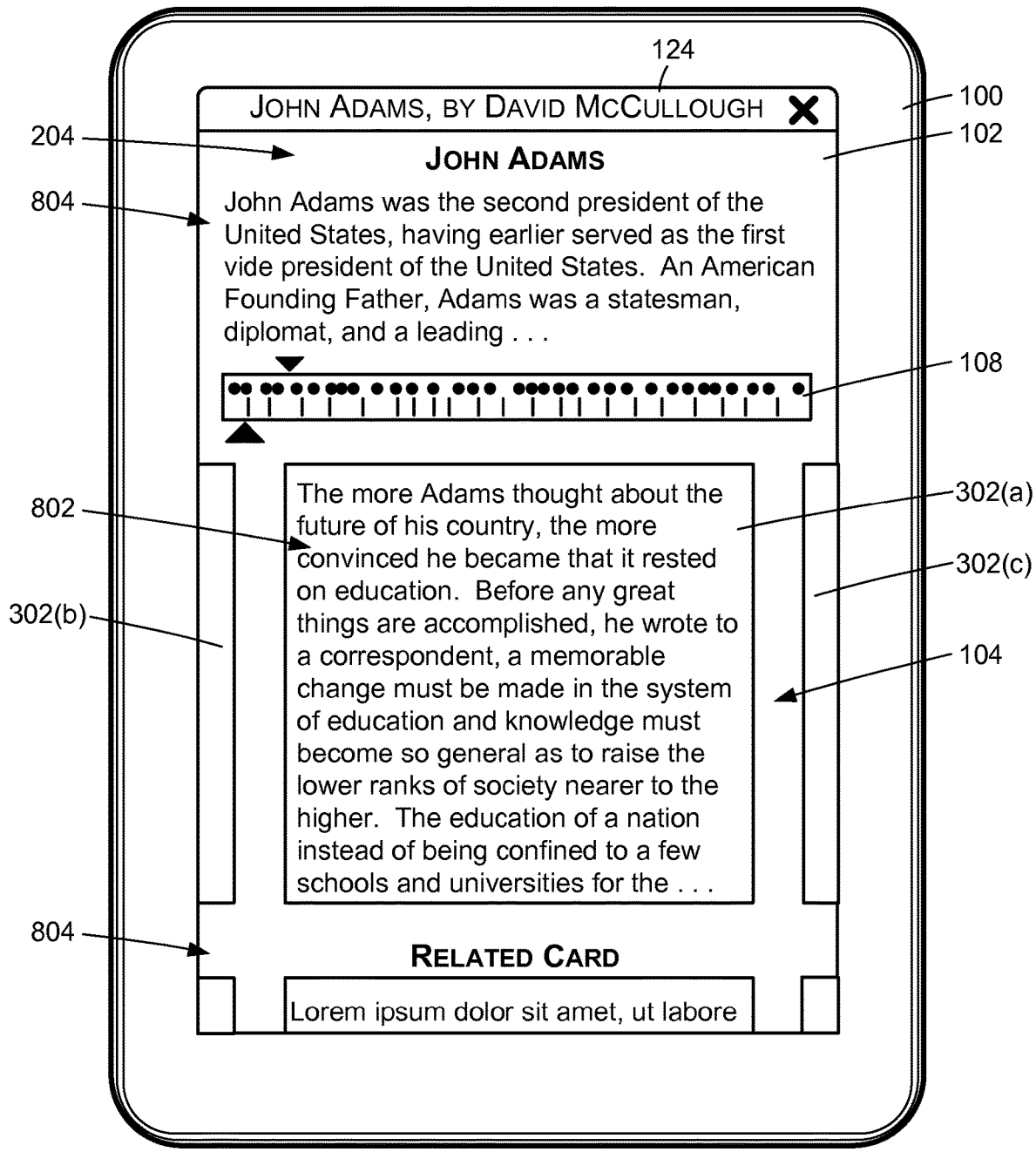
FIGS. 8 and 9 are conceptual diagrams illustrating an example format for presenting and displaying related key excerpts from different books.
Figure 9:
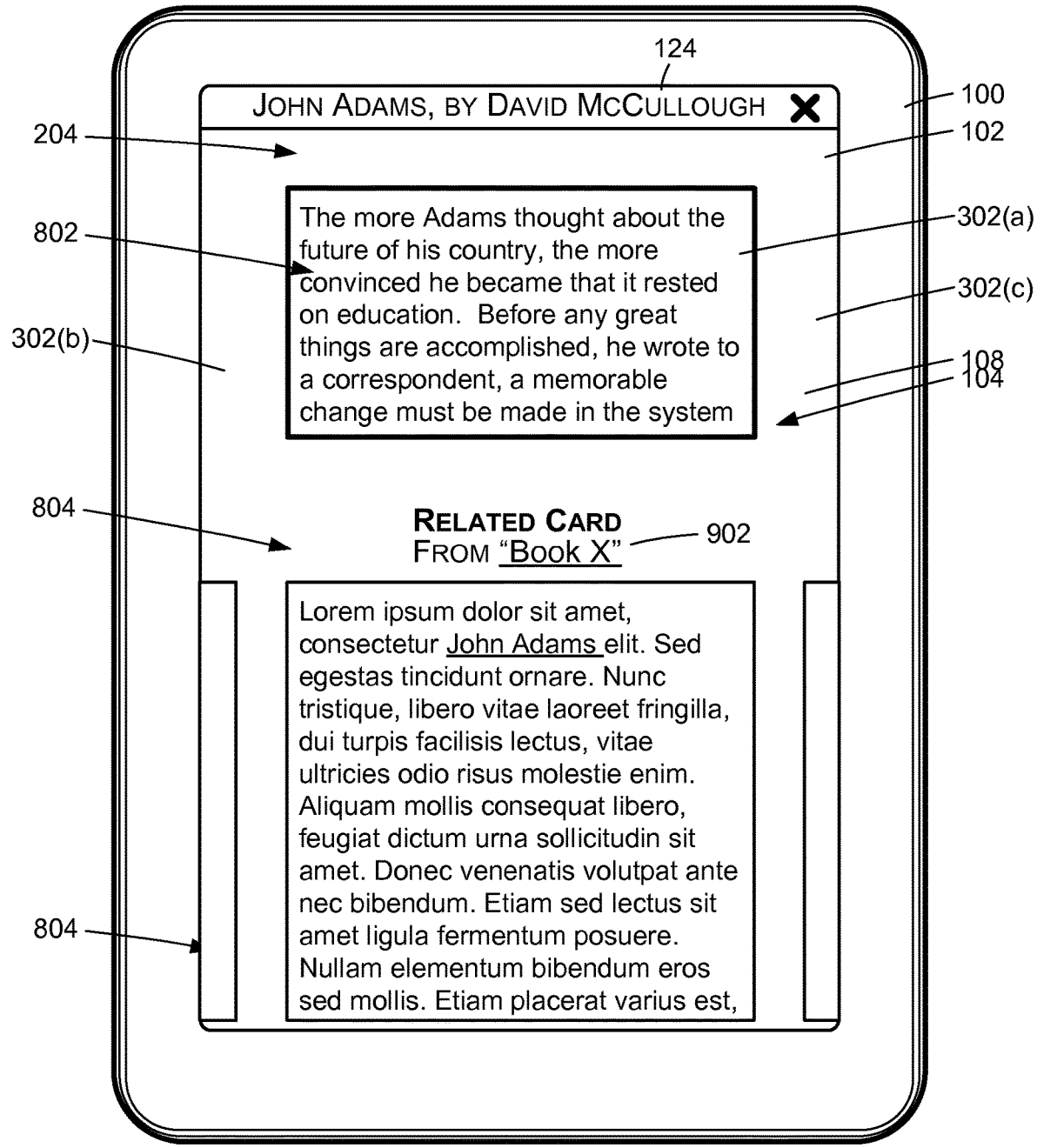

FIGS. 8 and 9 show an example of a display format for presenting related key excerpts from other books. As will be described in more detail below with reference to FIG. 10, a key excerpt of a particular book may be associated with related key excerpts of other books. Associated key excerpts may be related because they describe the same scene or topic, because they reference the same person or entity, or for other reasons.

In the example of FIG. 8, a selected key excerpt 802 of the currently active book is displayed in the excerpt area 104. A related excerpts section 804 is partially shown below the excerpt area 104 on the display 102. In various implementations, related key excerpts may be found in the same book, in different books altogether, or a combination. Further, the related key excerpts may be based on the content of cards, particular subjects (e.g., characters or places), or through other associations. For instance, cards with the same person (John Adams) may be used to identify any cards from any works that also mention that person.

In response to user input such as dragging upward, the related excerpts area 804 may be moved or scrolled upward so that it is visible as shown in FIG. 9. The original key excerpt 802 may also move upward and may shrink in order to make room for the related excerpts area 804. Once visible, the related excerpts area 804 may be scrolled from side to side in order to view key excerpts that are related or similar to the original key excerpt 802. The related key excerpts may include key excerpts from the currently active book as well as key excerpts from other books. The name of the work that contains the currently displayed related key excerpt may be displayed in a related title heading 902. The title heading 124 continues to indicate the name of the currently loaded book. In some cases, the related title heading 902 may comprise a link that allows the user to open or navigate to the indicated book. If the user does not already own or have access to the book, the user may be given the option of purchasing the book.

FIG. 8 also illustrates the use of a subject summary section 806, containing text introducing or summarizing the current subject. A summary section such as this may be used in conjunction with any of the formats described above to present information about the subject of the currently displayed key excerpt.

Figure 10:
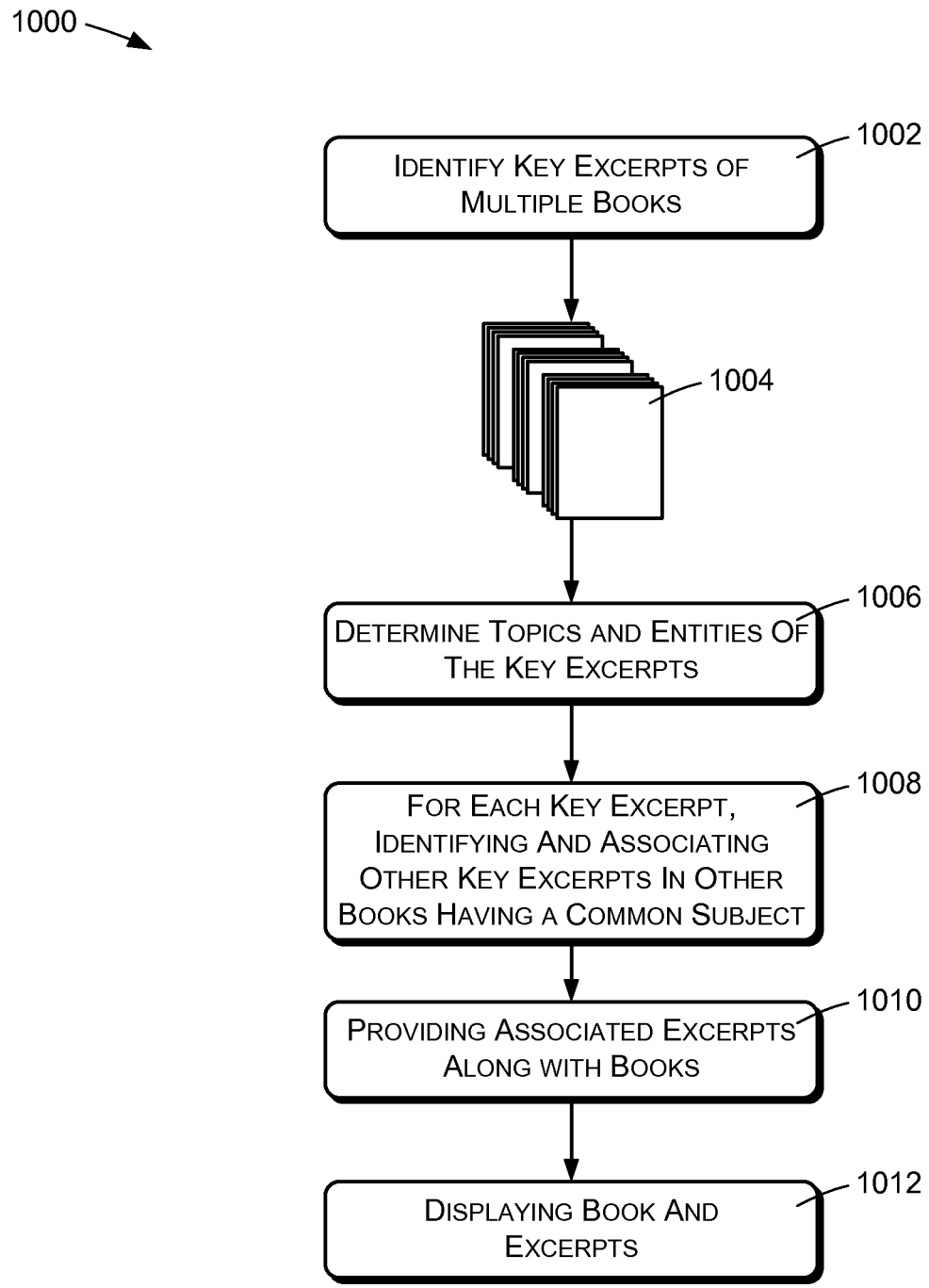
FIG. 10 is a flow diagram illustrating an example process for displaying identifying and displaying related key excerpts from different books.

FIG. 10 illustrates an example process 1000 for identifying, providing, and displaying related sets of excerpts from different books. An action 1002 comprises, for multiple digital works, identifying key excerpts of the digital works. Identifying key excerpts of a digital work may be performed in accordance with the process 500 of FIG. 5, which is generally based on (a) a number of interactions by human readers within each of the key excerpts and/or (b) a number of reviews that reference each of the key excerpts. The action 1002 results in key excerpts 1004 corresponding to different digital works. One or more sets of key excerpts 1004 may be associated with each of multiple digital works.

An action 1006 comprises performing topic and entity extraction to determine one or more topics of each key excerpt 1004 and one or more entities of each key excerpt 1004. An entity may comprise a person, a thing, an object, a place, a name or named entity, a term, etc. Topic and entity extraction may be performed across the key excerpts 1004 of multiple books using available techniques such as probabilistic latent semantic analysis (pLSA) or latent Dirichlet allocation (LDA) algorithms, including trained LDA algorithms. Annotations and quotes made by customers within the key excerpts may be analyzed to identify the one or more topics or entities and used in conjunction with such LDA algorithms to identify other topics or entities that are semantically or conceptually related.

An action 1008 comprises, for each key excerpt of each digital work, identifying one or more related key excerpts of one or more other digital works, such that the key excerpt and the one or more related key excerpts have a common topic or entity. The action 1008 may be performed by creating a vector space model for each key excerpt and comparing the models of each key excerpt. The action 1008 results in an association between a given key excerpt of a given book with multiple related key excerpts of multiple different books.

An action 1010 comprises providing the related key excerpts with the content of a particular digital book. Specifically, all key excerpts from other books that relate to key excerpts of the particular digital book are specified or provided with the particular book.

An action 1012 comprises displaying the particular book, its key excerpts, and the related key excerpts on the display of a reader device. The book and key excerpts may be formatted and displayed as described above with reference to FIGS. 8 and 9. For example, the reader device may initially display content of a first book in a reading view. In response to first user input, the reader device may display a first key excerpt of the first book. In response to second user input, the reader device may display second key excerpts that relate to the first key excerpt. The second key excerpts may be from different books, and may be presented in a scrollable format so that a user may move between the related key excerpts of the different books. As a particular related key excerpt is displayed, the title of the book it is from may also be displayed.

In some cases, the related key excerpts may limited to key excerpts from related books, such as the works of a series, works having common authorship, or works having a common subject.

Figure 11:
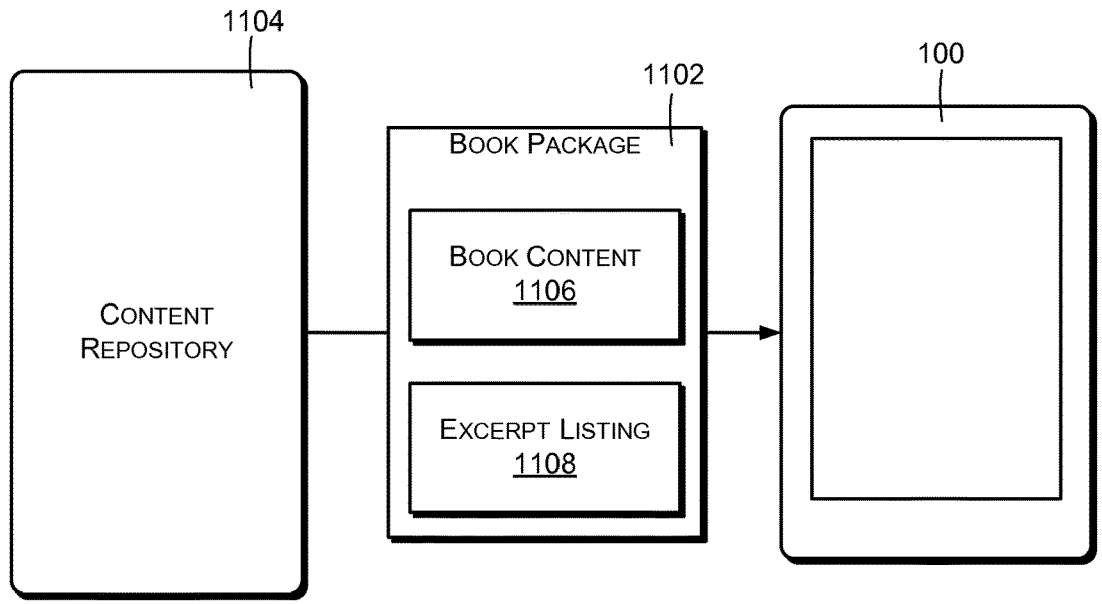
FIG. 11 is a block diagram illustrating delivery of a book and related key excerpts to a book reader device.

FIG. 11 illustrates an example of providing digital content to the device 100. A book or other digital work may be formatted and/or delivered as a package 1102 from an infrastructure or content repository 1104. The package 1102 may contain book text and/or other content 1106 and an excerpt listing 1108. The book content 1106 may comprise the text of the book, as well as accompanying illustrations, diagrams, pictures, or other associated content. The excerpt listing 1108 may indicate key excerpts of the book content 1106, including key excerpts relating to different subjects. The excerpt listing 1108 may also indicate key excerpts of other books that are related to key excerpts of the book represented by the book package 1102.

Figure 12:
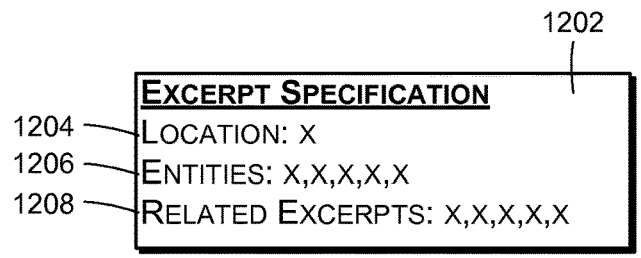
FIG. 12 shows an example key excerpt specification that may be used to specify information relating to a key excerpt of a digital work.

FIG. 12 shows an example of an excerpt specification 1202. The excerpt listing 1108 may contain multiple excerpt specifications 1202, corresponding respectively to different key excerpts of the book content 1106. Each excerpt specification 1202 indicates information that is sufficient for the device 100 to locate and display key excerpts of the digital work, as well as related key excerpts of other digital works.

A location field 1204 indicates the location within the book of the key excerpt. The location field may specify a particular paragraph or may specify the start and end of a key excerpt in terms of character counts from the beginning of the book.

An entity field 1206 may be used to specify subjects of the key excerpt and/or entities to which the key excerpt relates. Entities may include named entities, characters, people, places, events, objects, terms, and so forth. The indicated entities may in some cases comprise the entities that are specifically referenced within the key excerpt.

A related key excerpt field 1208 may indicate or specify one or more related key excerpts. Related key excerpts may comprise key excerpts from different books as described above with reference to FIG. 10. In some cases, the related key excerpt field 1208 may contain the key excerpts from the different books so that they may be displayed in conjunction with the key excerpt specified by the excerpt specification 1202.

Figure 13:
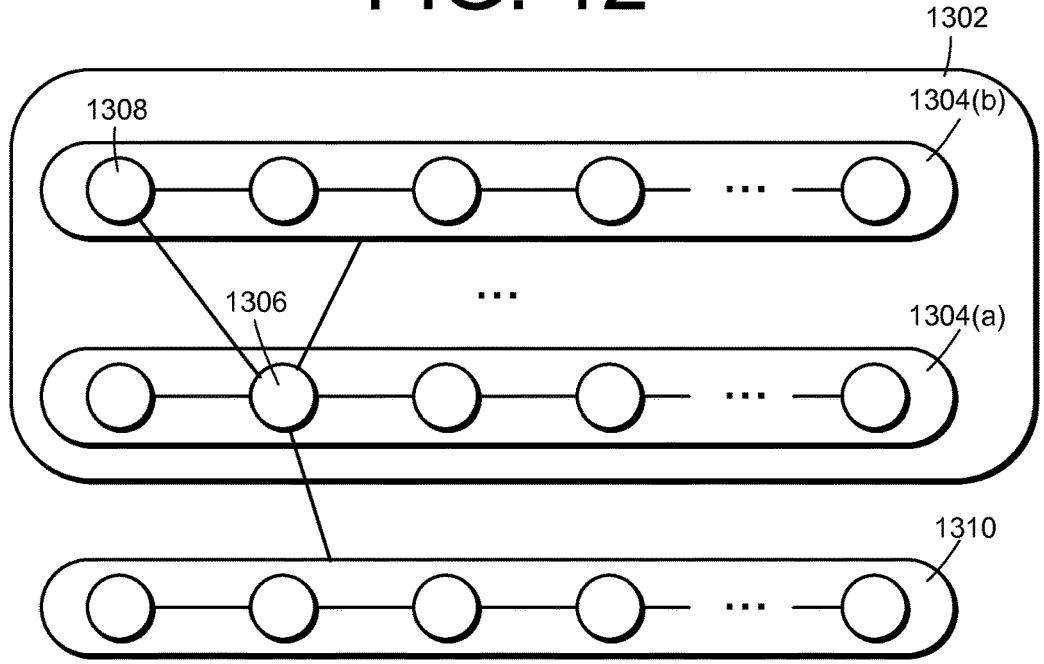
FIG. 13 is a conceptual diagram illustrating relationships between key excerpts within and between digital works.

FIG. 13 provides a conceptual illustration of relationships between key excerpts that may be explicitly or implicitly specified by key excerpt specifications such as the excerpt specification 1202 of FIG. 12. Key excerpts in this illustration are shown as nodes of a graph, with lines between the nodes representing relationships between the key excerpts.

A particular book 1302 may contain multiple sets of key excerpts, including a first set 1304(*a*) and a second set 1304(*b*). For purposes of discussion, assume that the first key excerpt set 1304(*a*) relates to a first subject and the second key excerpt set 1304(*b*) relates to a second subject.

The key excerpts within each key excerpt set 1304 are related to each other by having a common subject. The timeline or sequential relationships (left to right in FIG. 13) within a subject are defined by the locations of the key excerpts within the book 1302.

A particular key excerpt 1306 within the first key excerpt set 1304(*a*) may be related to the key excerpts of the second key excerpt set 1304 by having a common subject. For example, the key excerpt 1306 may relate to both the first subject and the second subject. Accordingly, the key excerpts of the set 1304(*b*) may be related to the key excerpt 1306.

The particular key excerpt 1306 may also be related directly to another key excerpt 1308 by having a common subject.

In addition, the key excerpt 1306 may be related to a third set of key excerpts 1310 that are not within the same book 1302 as the first and second sets 1304(*a*) and 1304(*b*) of key excerpts, and that may be in multiple different books. This type of relationship may be defined or identified by the process 1000 of FIG. 10. Key excerpts related in this way may relate to the same scene, topic, person, or other entity.

Although example relationships are shown for an arbitrarily selected key excerpt 1306, each of the illustrated key excerpts may have similar types of relationships both within a single book and with key excerpts of other books.

Figure 14:
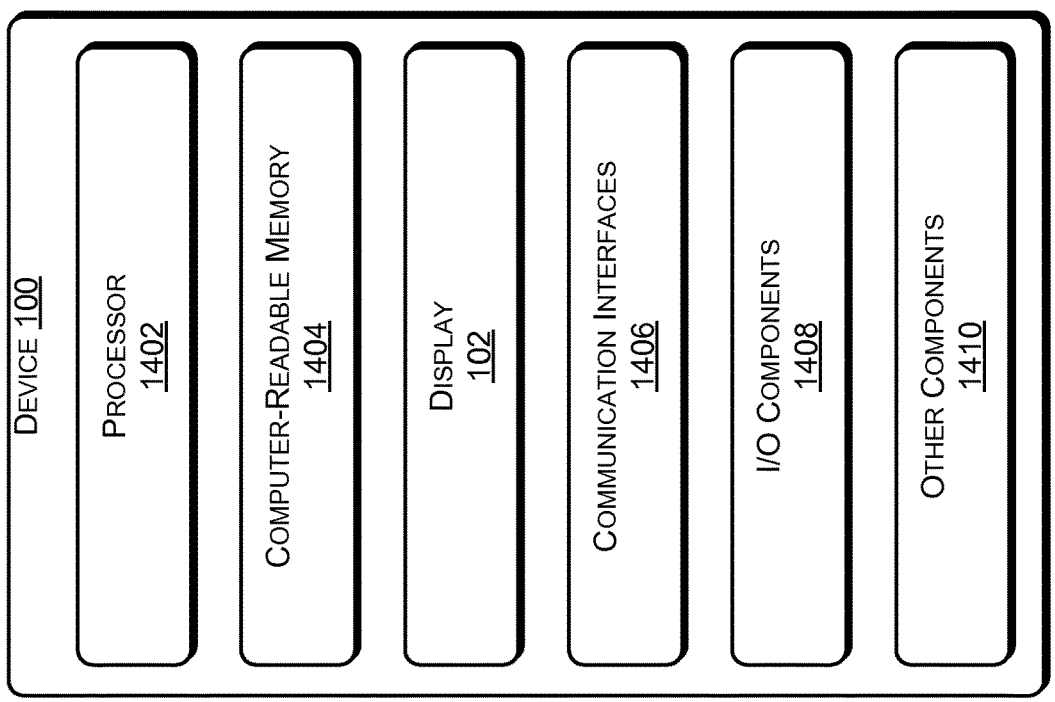
FIG. 14 is a block diagram of an example electronic book reader which may be used to display a digital work and associated key excerpts.

FIG. 14 illustrates select example components of the electronic device 100 that may be used to implement the functionality described above according to some implementations. In a very basic configuration, the electronic device 100 includes, or accesses, components such as at least one processor 1402 and computer-readable media 1404. Each processor 1402 may itself comprise one or more processors or cores. Depending on the configuration of the electronic device 100, the computer-readable media 1404 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1402 directly or through another computing device. Accordingly, the computer-readable media 1404 may be computer-readable media able to maintain instructions, modules or components executable by the processor 1402.

The computer-readable media 1404 may be used to store any number of functional components that are executable by the processor 1402. In some implementations, these functional components comprise instructions or programs that are executable by the processor 1402 and that, when executed, implement operational logic for performing the actions attributed above to the electronic device 100. The computer-readable media 1404 may also store data, data structures, and the like that are used by the functional components.

The device 100 may include the display 102, which may be passive, emissive or any other form of display. In one implementation, the display uses reflective display technology, which is bi-stable, meaning that it is capable of holding text or other rendered images even when very little or no power is supplied to the display. Some examples of suitable reflective displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the visual representations and other user interface components herein may be rendered in 3D or using dynamic perspective in which objects may appear to have shadows, parallax, and other effects that change depending on the viewpoint of the user to produce an illusion of depth.

One or more communication interfaces 1406 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 1406 may allow a user of the electronic device 100 to access the World Wide Web, download digital works and supplemental information from the infrastructure or repository 1104, access supplemental online content, such as a from a website or other network location, and the like. The communication interface 1406 may further allow a user to access storage on another device, such as a user's computing device, a network attached storage device, or the like.

The electronic device 100 may further be equipped with various other input/output (I/O) components 1408. Such I/O components may include a touchscreen and various user controls (e.g., buttons, a joystick, a keyboard, a mouse, etc.), speakers, a microphone for capturing user speech and other sounds, different types of cameras for detecting user motions and gestures, connection ports, and so forth. User controls may include page turning buttons, navigational keys, a power on/off button, selection keys, and so on. Additionally, the electronic device 100 may include various other components 1410 that are not shown, examples of which include removable storage, a power source, such as a battery and power control unit, a global positioning system (GPS) device, a PC Card component, and so forth.

Figure 15:
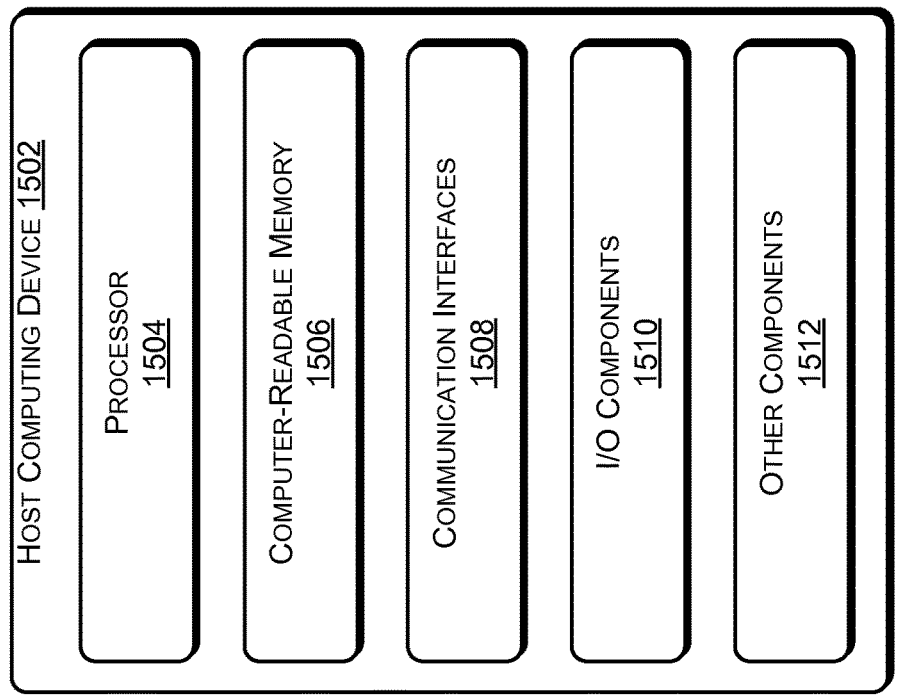
FIG. 15 is a block diagram of a host computing device that may be used to identify and display key excerpts and related key excerpts, and to provide such key excerpts to reader devices.

FIG. 15 illustrates select components of an example server, computer, or host computing device 1502, one or more of which may be configured to perform the processes of FIGS. 5 and 10. The example host computing device 1502 includes one or more processors 1504, computer-readable media 1506, and one or more communication interfaces 1508. The processor(s) 1504 may comprise a single processing unit or a number of processing units, and may include single or multiple computing units or multiple cores. The processor(s) 1504 can be configured to fetch and execute computer-readable instructions stored in the computer-readable media 1506 or other computer-readable media.

The computer-readable media 1506 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1502, the computer-readable media 1506 may be a type of computer-readable storage media and may be a non-transitory storage media.

The computer-readable media 1506 may be used to store any number of functional components that are executable by the processors 1504. In many implementations, these functional components comprise instructions or programs that are executable by the processors 1504 and that, when executed, implement operational logic for performing the actions described above with reference to FIGS. 5 and 10. The computer-readable memory may also be used for storing multiple book packages such as the book packages 602 and 1102 shown in FIGS. 6 and 11, respectively.

The host computing device 1502 may include communication interface(s) 1508, which may include one or more interfaces and hardware components for enabling communication with various other devices, such as the electronic devices 100, over a wide-area network such as the Internet.

The host computing device(s) 1502 may further be equipped with various input/output components 1510. Such I/O components 1510 may include a display, various user interface controls (e.g., buttons, mouse, keyboard, touch screen, etc.), audio speakers, connection ports and so forth.

The host computing device(s) 1502 may also include many other logical, programmatic and physical components 1512, of which those described above are merely examples that are related to the discussion herein.

The various processes and techniques described herein may be implemented at least in part by software, comprising instructions that are stored or maintained by the computer-readable memory of the device 100, the host computing device 1502, and/or of any other device, or by independent computer-readable memory that is used for storing and transferring the software.

This disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

The invention claimed is:

1. A system comprising:
one or more processors; and
one or more non-transitory computer-readable media maintaining instructions executable by the one or more processors to perform acts comprising:
obtaining text of a digital work;
identifying a first paragraph of text within the digital work, the first paragraph of text including an interaction with a word location by a first human reader, the interaction including one or more of annotating, quoting, sharing, or marking of the first paragraph of text, and wherein the identifying is performed by:
locating the interaction based at least in part on metadata associated with the word location, the metadata indicating the one or more of the annotating, the quoting, the sharing, or the marking of the first paragraph of text by the first human reader; and
determining, based at least in part on the metadata associated with the word location, that the word location is within a range of word locations associated with the first paragraph of text;
generating, based at least in part on a number of human readers that interacted with the word location associated with the first paragraph of text, a first score corresponding to the first paragraph of text;
identifying a first review associated with the digital work, the first review created by a second human reader;
determining, using one or more words from the first review to search the text of the digital work, that the first review quotes portions of the first paragraph of text;
generating, based at least in part on the first review quoting portions of the first paragraph of text and a number of second reviews that quote the first paragraph of text, a second score corresponding to the first paragraph of text;
calculating, based at least in part on the first score and the second score, a composite score corresponding to the first paragraph of text;
determining, based at least in part on the composite score, a ranking of the first paragraph of text among other paragraphs of text within the digital work;
selecting, based at least in part on the ranking, the first paragraph of text;
specifying the first paragraph of text for presentation in conjunction with a first set of paragraphs within the digital work;
determining a related digital work, the related digital work corresponding to the digital work by at least one of common authorship, a common topic, or a common series;
identifying a second paragraph of text and a third paragraph of text of the related digital work by at least one of:
a number of interactions by human readers with the second paragraph of text or the third paragraph of text; or
a number of reviews that reference the second paragraph of text or the third paragraph of text;
identifying at least one of a topic or an entity included in the first paragraph of text;
determining that the second paragraph of text and the third paragraph of text is associated with at least one of the topic or the entity; and
generating a user interface configured to display at least one of the second paragraph of text or the third paragraph of text in conjunction with the first paragraph of text within the digital work, wherein the user interface includes a navigational element configured to allow navigation between the second paragraph of text and the third paragraph of text while displaying the first paragraph of text.

2. The system of claim 1, wherein the one or more non-transitory computer-readable media maintain instructions executable by the one or more processors to further perform acts comprising:
visibly scrolling through the first set of paragraphs of the digital work to display the first paragraph of text;
displaying, in conjunction with the first set of first paragraphs, a first timeline indicating first locations of individual paragraphs within the first set;
visibly scrolling through a second set of paragraphs within the digital work;
displaying, in conjunction with the second set of paragraphs, a second timeline indicating second locations of individual paragraphs within the second set; and
wherein the first set and the second set relate to different characters within the digital work.

3. The system of claim 1, wherein the one or more non-transitory computer-readable media maintain instructions executable by the one or more processors to further perform acts comprising:
determining a subject of the first paragraph of text, and
wherein specifying the first paragraph of text for presentation in conjunction with the first set of paragraphs is based at least in part on the subject of the first paragraph of text, the first set of paragraphs relating to the subject.

4. The system of claim 1, wherein the one or more non-transitory computer-readable media maintain instructions executable by the one or more processors to further perform acts comprising:
defining a first section of the digital work comprising a first set of contiguous paragraphs;
defining a second section of the digital work comprising a second set of contiguous paragraphs;
specifying a fourth paragraph of text from the first section of the digital work for presentation in conjunction with the digital work; and
specifying a fifth paragraph of text from the second section of the digital work for presentation in conjunction with the digital work.

5. A method, comprising:
receiving an indication of user interactions within digital content of a first digital work;
determining a location of the user interactions within the digital content, wherein individual locations of a user interaction is determined based at least in part on metadata associated with words of the digital content;
determining a first number of user interactions within a first excerpt of the digital content;
determining a second number of user interactions within a second excerpt of the digital content;
determining, based at least in part on the first number and the second number, a ranking of the first excerpt relative to the second excerpt;

associating, based at least in part on the ranking being equal to or over a predefined threshold, the first excerpt with a first set of excerpts within the digital content;

selecting the first set of excerpts;

causing the first set of excerpts to be presented in conjunction with the digital content;

determining related digital content of a second digital work, the related digital content corresponding to the digital content by at least one of common authorship, a common topic, or a common series;

identifying a third excerpt and a fourth excerpt of the related digital content by at least one of:
- a third number of user interactions within the third excerpt or the fourth excerpt; or
- a number of reviews that reference the third excerpt or the fourth excerpt;

identifying at least one of a topic or an entity included in the first excerpt;

determining that the third excerpt and the fourth excerpt are associated with at least one of the topic or the entity; and generating a user interface configured to display at least one of the third excerpt or the fourth excerpt in conjunction with the first set of excerpts with the digital content, wherein the user interface includes a navigational element configured to allow navigation between the third excerpt and the fourth excerpt while displaying the first set of excerpts.

6. The method of claim 5, wherein receiving the indication is based at least in part on receiving one or more of annotating, quoting, sharing, or marking of the digital content.

7. The method of claim 5, wherein selecting the first set of excerpts comprises selecting a set of paragraphs within the digital content.

8. The method of claim 5, wherein selecting the first set of excerpts comprises selecting a set of highest ranking excerpts within the digital content.

9. The method of claim 5, further comprising:
determining, by one or more first reviews of the digital content, a first number of references to the first excerpt;
determining, by one or more second reviews of the digital content, a second number of references to the second excerpt; and
wherein determining the ranking is further based at least in part on the first number of references and the second number of references.

10. The method of claim 5, wherein selecting the first set of excerpts comprises selecting, based at least in part on the ranking, one or more excerpts from each of multiple sections of the digital content.

11. The method of claim 5, further comprising constraining the first set of excerpts and a second set of excerpts to a common subject of the digital content.

12. The method of claim 5, further comprising:
visibly scrolling through one or more first excerpts of the first set of excerpts to display a first selected excerpt from the first set of excerpts;
displaying, in conjunction with the first set of excerpts, a first timeline indicating a first location of the first selected excerpt within the digital content;
visibly scrolling through one or more second excerpts of a second set of excerpts to display a second selected excerpt of the second set of excerpts;
displaying, in conjunction with the second set of excerpts, a second timeline indicating a second location of the second selected excerpt within the digital content; and
wherein the first set of excerpts and the second set of excerpts relate to different subjects of the digital content.

13. A method, comprising:
determining, based at least in part on one or more first reviews of digital content of a first digital work, a first number of references to a first excerpt of the digital content, wherein the first number of references is determined using first metadata associated with one or more word locations of the first excerpt;
determining, based at least in part on one or more second reviews of the digital content, a second number of references to a second excerpt of the digital content, wherein the second number of references is determined using second metadata associated with one or more word locations of the second excerpt;
determining, based at least in part on the first number and the second number, a ranking of the first excerpt relative to the second excerpt;
selecting, based at least in part on the ranking, a first set of excerpts, the first set of excerpts corresponding to one or more excerpts from each of multiple sections of the digital content, the first set of excerpts including the first excerpt;
associating, for presentation, the first set of excerpts and the digital content;
determining related digital content of a second digital work, the related digital content corresponding to the digital content by at least one of common authorship, a common topic, or a common series;
identifying a third excerpt and a fourth excerpt of the related digital content by at least one of:
- a number of interactions by readers with the third excerpt or the fourth excerpt; or
- a number of reviews that reference the third excerpt or the fourth excerpt;
identifying at least one of a topic or an entity included in the first excerpt;
determining that the third excerpt and the fourth excerpt are associated with at least one of the topic or the entity; and
generating a user interface configured to display at least one of the third excerpt or the fourth excerpt in conjunction with the first set of excerpts and the digital content, wherein the user interface includes a navigational element configured to allow navigation between the third excerpt and the fourth excerpt while displaying the first set of excerpts.

14. The method of claim 13, wherein selecting the first set of excerpts comprises selecting a set of highest ranking excerpts within the digital content.

15. The method of claim 13, further comprising:
determining a first number of user interactions within the first excerpt;
determining a second number of user interactions within the second excerpt; and
wherein determining the ranking is further based at least in part on the first number of user interactions and the second number of user interactions.

16. The method of claim 13, further comprising constraining the first excerpt and the second excerpt to a common subject of the digital content.

17. The method of claim 13, wherein determining the first number of references comprises performing approximate string matching to locate a text string within the digital content that at least approximately matches a text string within the one or more first reviews of the digital content.

18. The method of claim 13, further comprising:
visibly scrolling through one or more first excerpts of the first set of excerpts to display a first selected excerpt of the first set of excerpts;
displaying, in conjunction with the first set of excerpts, a first timeline indicating a first location of the first selected excerpt within the digital content;
visibly scrolling through one or more second excerpts of a second set of excerpts to display a second selected excerpt of the second set of excerpts, the second set of excerpts relating to a different subject than the first set of excerpts; and
displaying, in conjunction with the second set of excerpts, a second timeline indicating a second location of the second selected excerpt within the digital content.

19. The method of claim 5, wherein selecting the first set of excerpts is further based at least in part on a dispersion algorithm corresponding to a location of the first set of excerpts within the digital content.

20. The method of claim 13, further comprising determining a first character length of the first excerpt and a second character length of the second excerpt, and wherein selecting the first excerpt is further based at least in part on the first excerpt being equal to or greater than a predefined character length.

* * * * *